(12) United States Patent
Shinano et al.

(10) Patent No.: US 12,429,750 B2
(45) Date of Patent: Sep. 30, 2025

(54) MANUALLY OPERATED RING DRIVE DEVICE

(71) Applicant: Panasonic Intellectual Property Management Co., Ltd., Osaka (JP)

(72) Inventors: Fumio Shinano, Osaka (JP); Tetsuya Morita, Osaka (JP); Yuichiro Kimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 5 days.

(21) Appl. No.: 17/793,677

(22) PCT Filed: Dec. 17, 2021

(86) PCT No.: PCT/JP2021/046663
§ 371 (c)(1),
(2) Date: Jul. 19, 2022

(87) PCT Pub. No.: WO2023/084797
PCT Pub. Date: May 19, 2023

(65) Prior Publication Data
US 2024/0219812 A1    Jul. 4, 2024

(30) Foreign Application Priority Data
Nov. 15, 2021   (JP) .................................. 2021-185778

(51) Int. Cl.
*G03B 13/32*    (2021.01)
(52) U.S. Cl.
CPC .................................... *G03B 13/32* (2013.01)
(58) Field of Classification Search
CPC ...................................................... G03B 13/32
USPC ........................................................... 359/825
See application file for complete search history.

(56) References Cited

U.S. PATENT DOCUMENTS

| 9,804,481 | B2 | 10/2017 | Hatakeyama |
| 10,705,413 | B2 | 7/2020 | Zhao et al. |
| 11,131,910 | B2 | 9/2021 | Zhao et al. |
| 2017/0235212 | A1 | 8/2017 | Hatakeyama |

(Continued)

FOREIGN PATENT DOCUMENTS

| JP | H06-342181 A | 12/1994 |
| JP | 2001-142107 A | 5/2001 |
| JP | 2006-220440 A | 8/2006 |

(Continued)

OTHER PUBLICATIONS

International Search Report for corresponding Application No. PCT/JP2021/046663, mailed Mar. 8, 2022.

*Primary Examiner* — Bumsuk Won
*Assistant Examiner* — Grant A Gagnon
(74) *Attorney, Agent, or Firm* — Renner, Otto, Boisselle & Sklar, LLP

(57) ABSTRACT

A zoom ring drive device (10) comprises a guide unit (11), a guide unit (14), a drive gear (21), and a DC motor (23). The guide unit (11) slides in the optical axis direction of a lens (L1) included in the lens barrel (32). The guide unit (14) is provided to the guide unit (11) and slides in a direction perpendicular to the optical axis direction. The drive gear (21) is provided in the guide unit (14) at a position where the drive gear comes into contact with a ring gear (25) wound around a zoom ring (33), and rotates in a state of being in contact with the ring gear (25) to rotate the zoom ring (33). The DC motor (23) is provided to the guide unit (14) and rotationally drives the drive gear (21).

15 Claims, 23 Drawing Sheets

(56) References Cited

U.S. PATENT DOCUMENTS

| | | |
|---|---|---|
| 2018/0299752 A1 | 10/2018 | Zhao et al. |
| 2020/0333694 A1 | 10/2020 | Zhao et al. |

FOREIGN PATENT DOCUMENTS

| | | |
|---|---|---|
| JP | 2015-040909 A | 3/2015 |
| JP | 2017-146344 A | 8/2017 |
| JP | 2019-506773 A | 3/2019 |
| JP | 2019-144439 A | 8/2019 |
| WO | 2011/153163 A2 | 12/2011 |

# MANUALLY OPERATED RING DRIVE DEVICE

TECHNICAL FIELD

The present disclosure relates to a manually operated ring drive device for driving a manually operated ring such as a zoom ring or a focus ring of a lens barrel mounted on a camera body.

BACKGROUND ART

Recent years have seen the use of a camera system comprising a lens barrel in which a gear is provided around the outer periphery of a manually operated ring such as a zoom ring, and an accessory having a connecting member for connecting this gear to a rotation handle.

For instance, Patent Literature 1 discloses an accessory coupling device comprising a ring portion and three or more support arms, one end of which is pivotably supported on the inside diameter side of the ring portion, and the other end of which is pivotably attached to a lens fixing portion fixed to a lens barrel, wherein the device can be used regardless of the outside diameter of the lens barrel.

CITATION LIST

Patent Literature

Patent Literature 1: JP-A 2015-040909

SUMMARY

Technical Problem

However, the following problems are encountered with the above-mentioned conventional accessory coupling device.

With the accessory coupling device disclosed in the above publication, since three supporting arms support the outer peripheral surface of the lens barrel in a state of being pivotable on the inner diameter side, mounting is possible regardless of the outside diameter of the lens barrel.

However, if the length (total length) of the lenses included in the lens barrel in the optical axis direction is large, there may be so much imbalance between the position of the camera body and the positions of the portions supported by the three supporting arms in the lens barrel that mounting is impossible.

Also, the conventional accessory coupling device discussed above is configured such that a fixing screw is threaded into a dedicated screw hole provided to the focus ring, in a state in which a threaded hole in the lens fixing portion of the accessory coupling device is aligned, which means that this can only be used with a dedicated focus ring.

It is an object of the present disclosure to provide a zoom ring drive device that can be mounted to a lens barrel regardless of the outside diameter of the lens barrel and its length in the optical axis direction.

Solution to Problem

The manually operated ring drive device according to the present disclosure is a ring drive device that rotationally drives a manually operated ring included in a lens barrel mounted on a camera body, comprising a first guide unit, a second guide unit, a drive gear, and a drive unit. The first guide unit can slide in the optical axis direction of the lens included in the lens barrel. The second guide unit is provided to the first guide unit and can slide in a direction perpendicular to the optical axis direction. The drive gear is provided at a position in the second guide unit that is in direct or indirect contact with the manually operated ring, and rotates in a state of contact with the manually operated ring to rotate the manually operated ring. The drive unit is provided to the second guide unit and rotationally drives the drive gear.

Effects

With the manually operated ring drive device according to the present disclosure, mounting to a lens barrel is possible regardless of the outside diameter of the lens barrel and its length in the optical axis direction.

DESCRIPTION OF EMBODIMENTS

Embodiments will now be described in detail with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Also, in the following description, the "optical axis direction" means the direction along the optical axis of the lens L1 included in the lens barrel 32, and the "direction perpendicular to the optical axis direction" shall be a direction perpendicular to the optical axis direction within a plane including the optical axis.

Embodiment 1

The zoom ring drive device (manually operated ring drive device) 10 according to an embodiment of the present disclosure will now be described with reference to FIGS. 1 to 15B.

Figure 1:
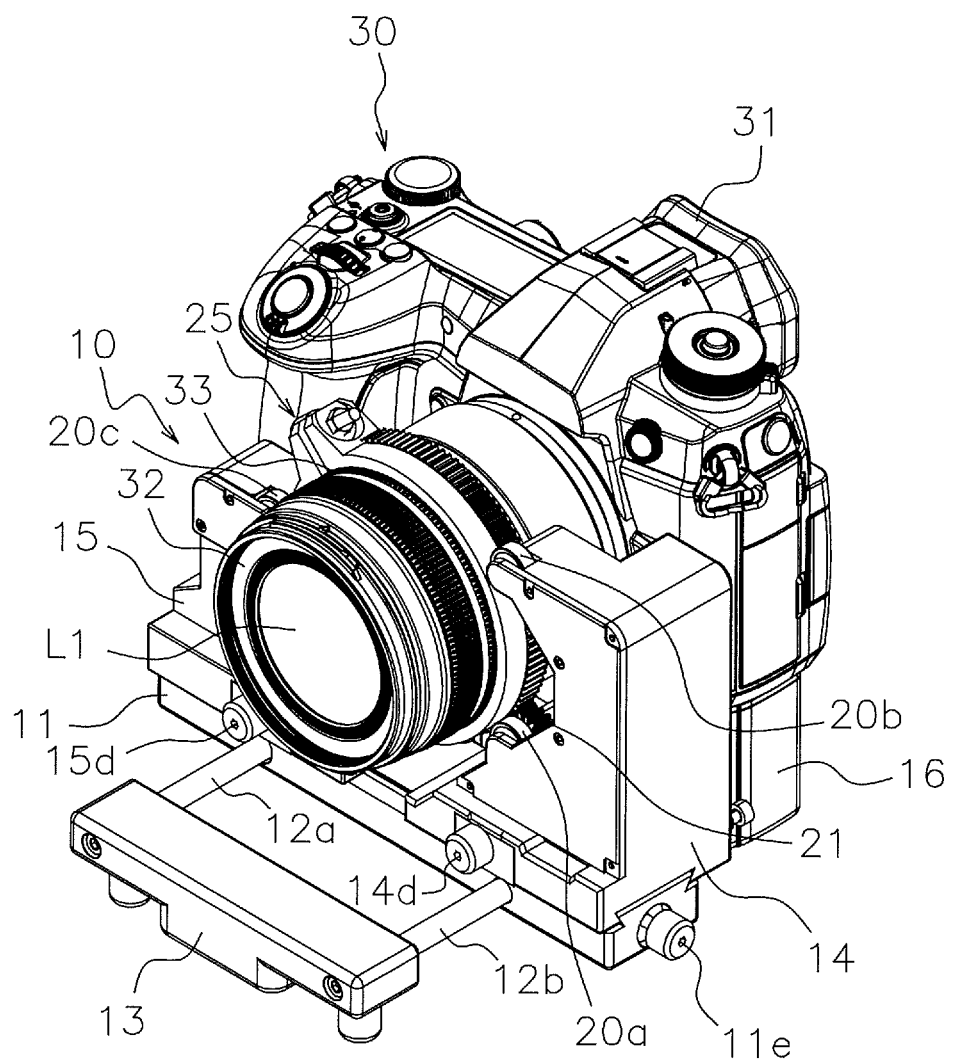
FIG. 1 is an overall oblique view of a state in which a camera has been placed in the zoom ring drive device according to an embodiment of the present disclosure.

The zoom ring drive device 10 according to this embodiment is used, for example, to control the rotation operation of a zoom ring (manually operated ring) 33 when continuously capturing a moving picture with a camera 30. The zoom ring drive device 10 rotationally drives the zoom ring 33, which is rotated around the outer peripheral surface of the lens barrel 32 mounted on a camera body 31, and is used in a state in which the camera 30 is mounted as shown in FIG. 1.

(1) Configuration of Camera 30

The camera 30 is capable of capturing still or moving pictures, and comprises a camera body 31 and a lens barrel 32.

The camera body 31 converts the light incident through the lens barrel 32 into a signal by using a built-in image sensor (not shown), and forms an image.

The lens barrel 32 is mounted to the camera body 31 in a detachable state, includes a plurality of lenses L1, etc., along the optical axis direction, and emits light that is incident from the lens L1 side to the camera body 31 side. The lens barrel 32 includes a zoom ring 33 whose drive is controlled by the zoom ring drive device 10 of this embodiment.

Figure 2A:
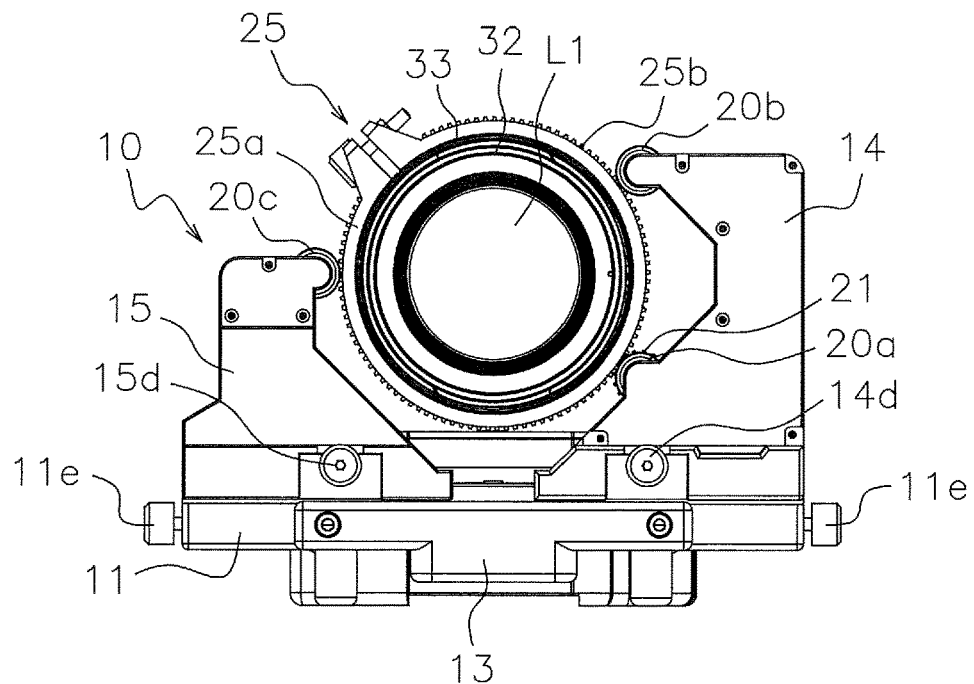
FIG. 2A is a front view of the state on the lens barrel side when the camera has been placed in the zoom ring drive device of FIG. 1.

Also, as shown in FIG. 2A, the outer peripheral surface of the lens barrel 32 is held in a state of being indirectly supported at three points by three rollers 20a, 20b, and 20c included in the zoom ring drive device 10, via the ring gear 25.

Only the lens barrel 32 is shown in FIG. 2A for the sake of simplicity, but let us assume that in actual practice the lens barrel 32 is mounted on the camera body 31. The same applies to FIGS. 7A, 7B, 11, 13, and 20 below.

Figure 2B:
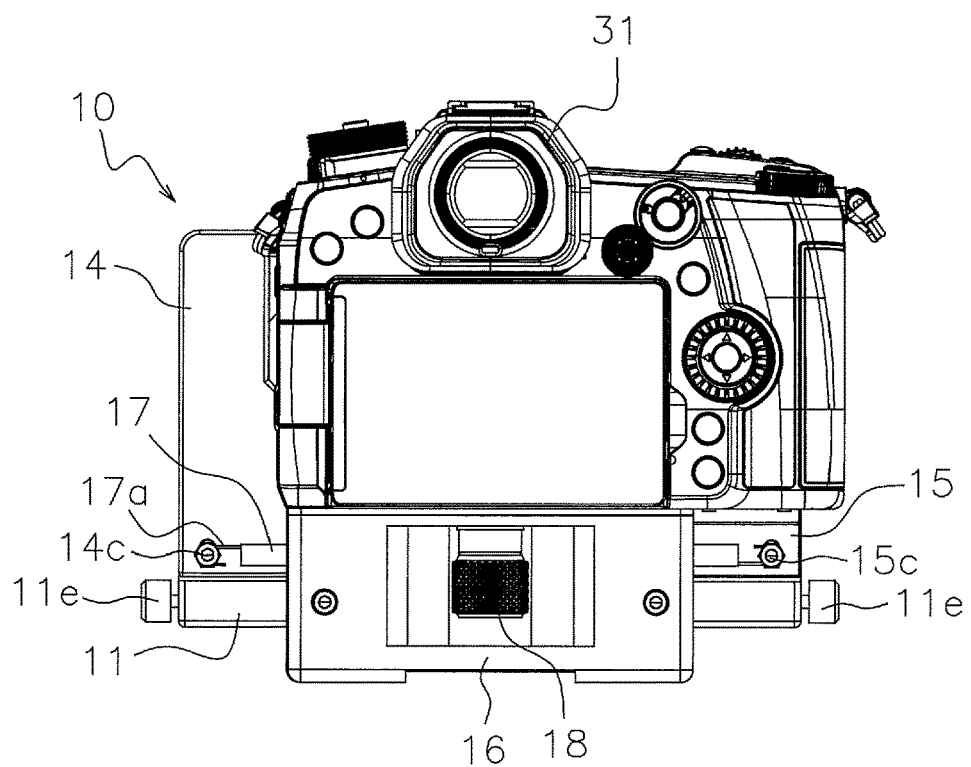
FIG. 2B is a rear view of the state on the camera body side when the camera has been placed in the zoom ring drive device of FIG. 1.

At this point, as shown in FIG. 2B, the camera body 31 is fixed by threading a fixing screw 18, which provided on the base unit 16 of the zoom ring drive device 10, into a threaded hole made in the bottom surface of the camera body 31.

The zoom ring 33 is an annular member provided for performing a zoom operation by moving a zoom lens (not shown) back and forth in the optical axis direction, this lens being one of a plurality of lenses built into the lens barrel 32. The zoom ring 33 is turned on the outermost peripheral surface of the lens barrel 32. As shown in FIGS. 1, 2A, etc., a ring gear 25 that meshes and rotates with the drive gear 21 of the zoom ring drive device 10 is attached to the outer peripheral side of the zoom ring 33 in a state of being incapable of relative rotation.

(2) Configuration of Zoom Ring Drive Device 10

Figure 3:
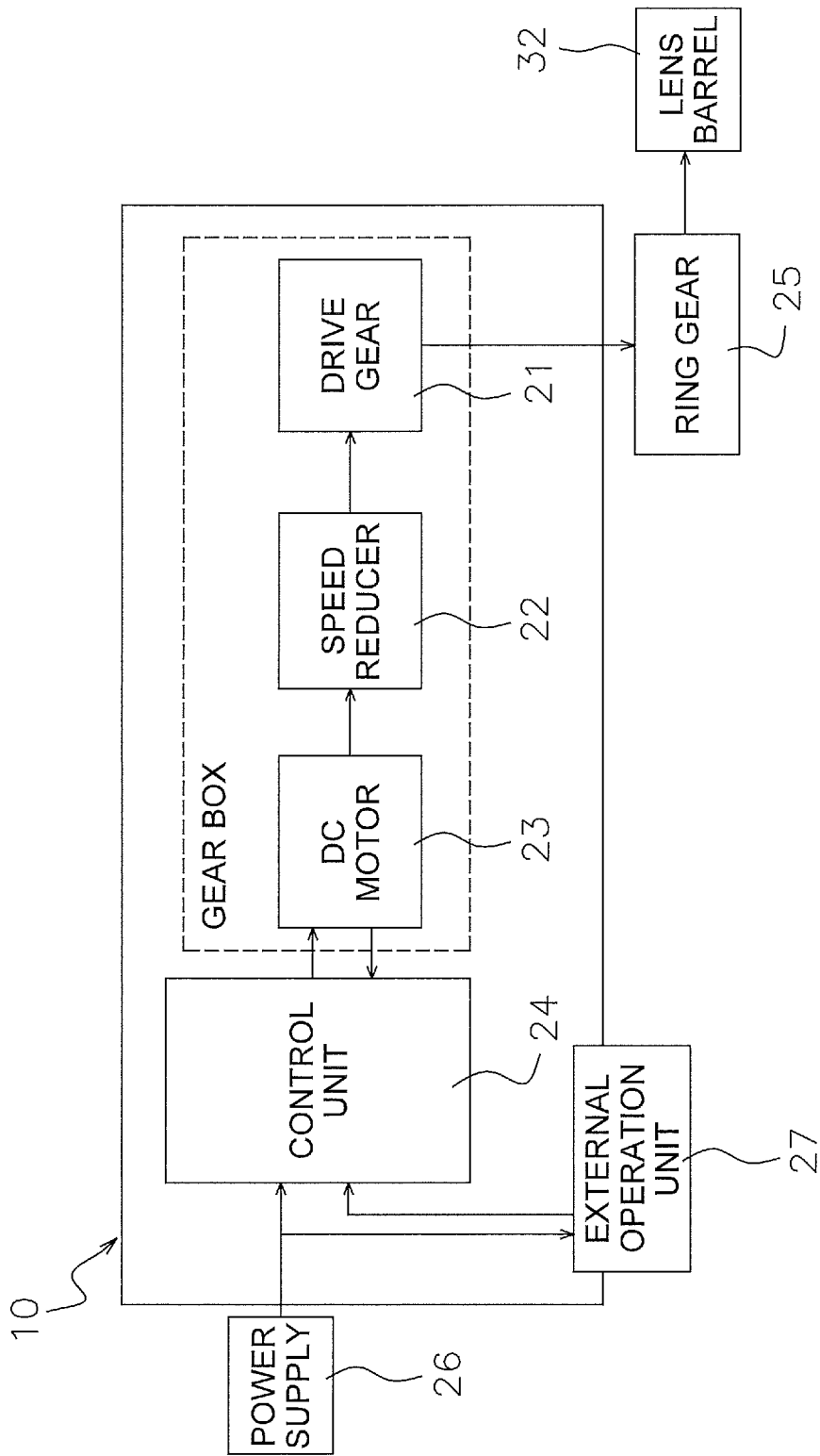
FIG. 3 is a control block diagram of the zoom ring drive device in FIG. 1.

In order to control the drive of the zoom ring 33 of the lens barrel 32, the zoom ring drive device 10 has a drive gear 21, a speed reducer 22, a DC motor (drive unit) 23, a power supply 26, and an external operation unit 27, as shown in FIG. 3.

The drive gear 21 is a gear member that rotationally drives the zoom ring 33 of the lens barrel 32 of the camera 30 set in the zoom ring drive device 10, and rotationally drives the zoom ring 33 via a ring gear 25 that is mounted on the outer peripheral surface of the zoom ring 33.

The speed reducer 22 is a mechanism for transmitting the rotational torque of the DC motor 23 to the drive gear 21 while reducing the rotational speed, and is constituted by a plurality of reduction gears.

The DC motor 23 is a drive source that applies rotational torque to the drive gear 21 via the speed reducer 22, is rotated by electrical power supplied from the power supply 26, and is controlled by the control unit 24.

The power supply 26 supplies electrical power to the various mechanisms of the zoom ring drive device 10. The power supply 26 may be provided inside the zoom ring drive device 10, or may be an external power supply.

The external operation unit 27 is provided, for example, at a position that is exposed on the outer surface of the zoom ring drive device 10, and the user uses this to input settings and so forth for the zoom ring drive device 10.

Here, the detailed configuration of the zoom ring drive device 10 of this embodiment will be described with reference to the drawings.

Figure 4:
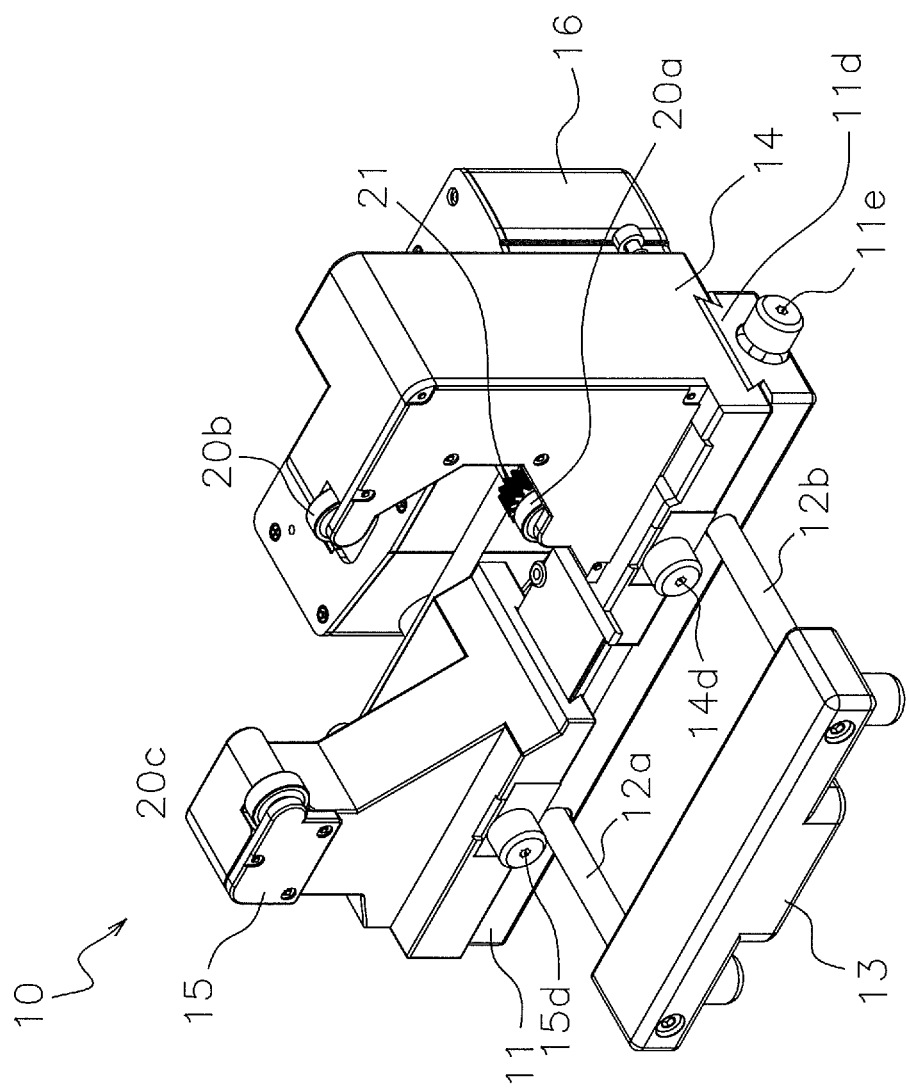
FIG. 4 is an oblique view of the configuration of the zoom ring drive device in FIG. 3.
Figure 5:
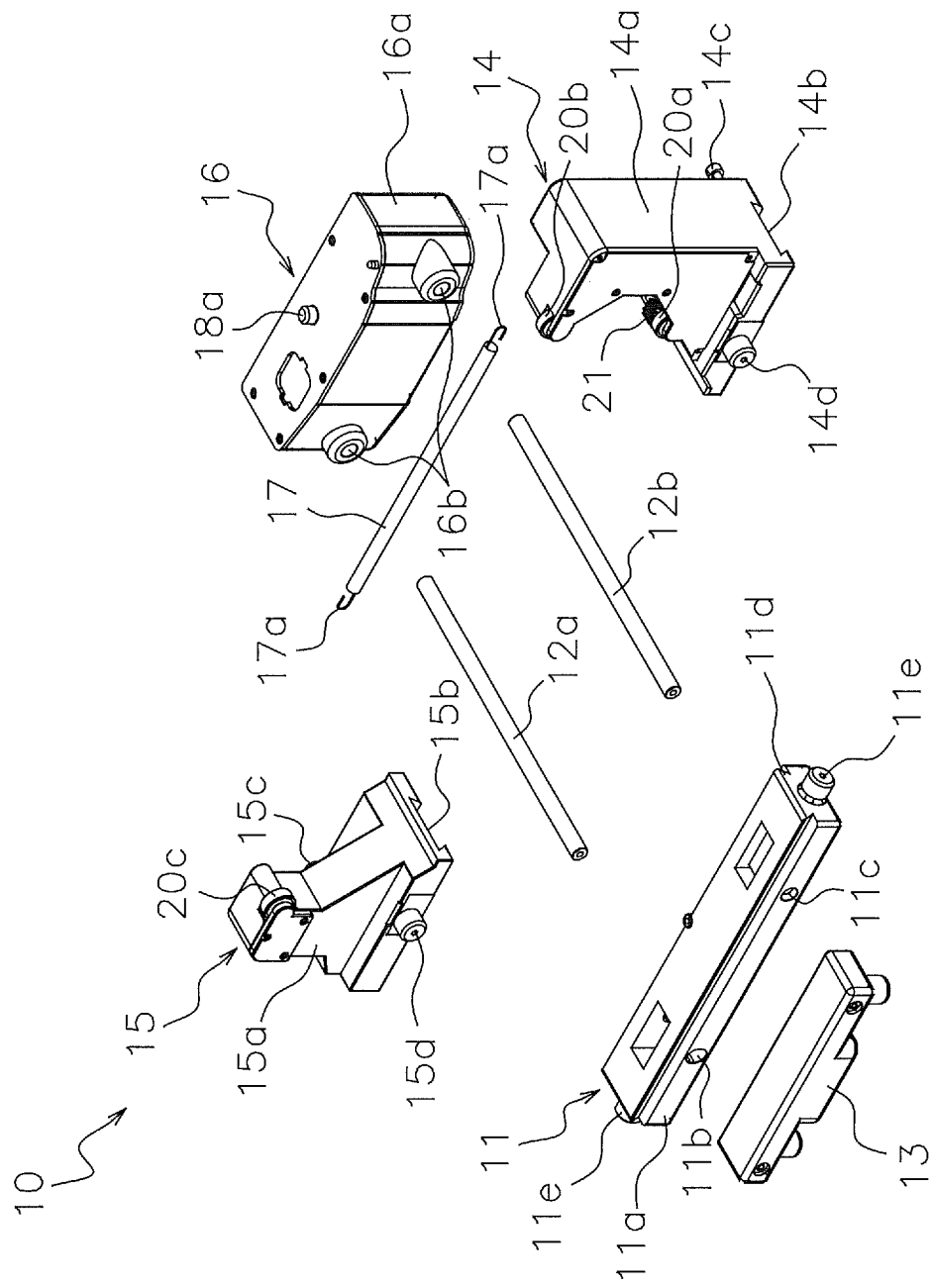
FIG. 5 is an exploded oblique view of the zoom ring drive device in FIG. 4.

As shown in FIGS. 4 and 5, the zoom ring drive device 10 of this embodiment comprises a guide unit (first guide unit) 11, guide shafts 12a and 12b, a front unit 13, a guide unit (second guide unit) 14, a guide unit (third guide unit) 15, a base unit 16, a spring (biasing member) 17, a fixing screw 18, three rollers 20*a*, 20*b*, and 20*c*, a drive gear 21, a speed reducer 22, a DC motor 23, and a ring gear 25.

The two guide shafts 12*a* and 12*b*, whose ends are fixed to the front unit 13 and the base unit 16, respectively, are inserted in the guide unit (first guide unit) 11, and this guide unit can be slid back and forth between the front unit 13 and the base unit 16. As shown in FIG. 5, the guide unit 11 includes a main body portion 11*a*, a slot 11*b*, a through-hole 11*c*, a rail portion 11*d*, fixing screws (first fixing portions) 11*e*, and fixing members (first fixing portions) 11*f*.

As shown in FIG. 5, the main body portion 11*a* is a member having a substantially cuboid shape, and two through-holes (the slot 11*b* and the through-hole 11*c*) pass through the surfaces on the long sides.

As shown in FIG. 5, the slot 11*b* is formed as a hole that is longer in the up and down direction (vertical direction), in which the guide shaft 12*a* is inserted. The support structure of the guide shaft 12*a* in the slot 11*b* will be described below in greater detail.

As shown in FIG. 5, the through-hole 11*c* is formed as a substantially circular hole into which the guide shaft 12*b* is inserted.

As shown in FIG. 5, the rail portion 11*d* is a convex portion provided at both ends on the upper surface side, and the guide units 14 and 15 are slid in a direction perpendicular to the optical axis direction in a state in which rail portions 14*b* and 15*b* of the guide units 14 and 15 have been engaged.

Figure 6A:
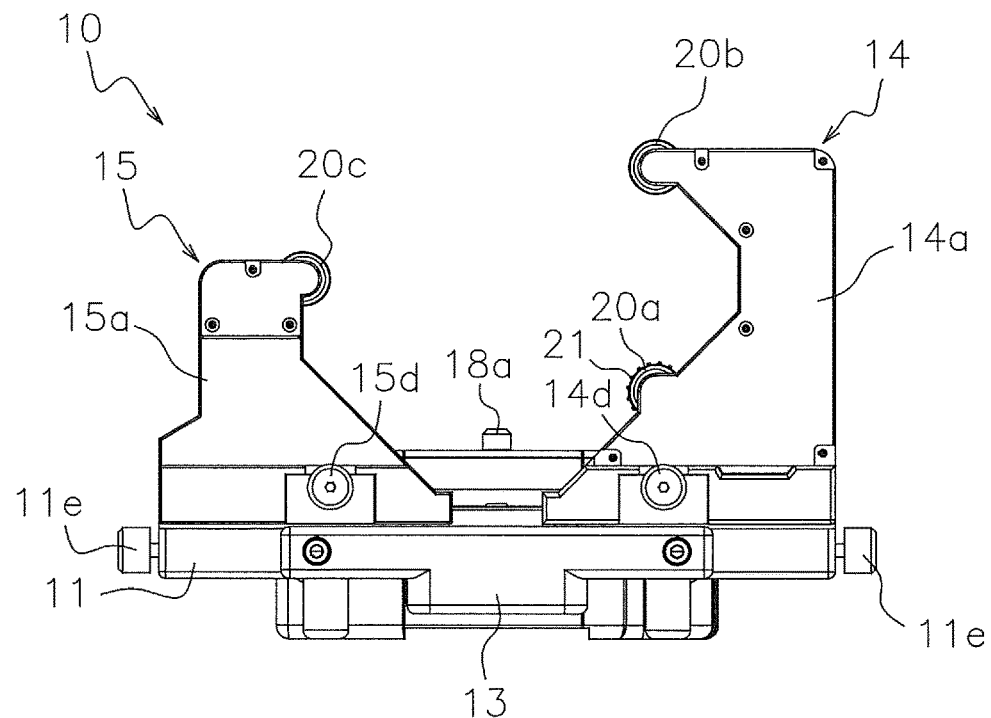
FIG. 6A is a front view of the zoom ring drive device in FIG. 4.
Figure 6B:
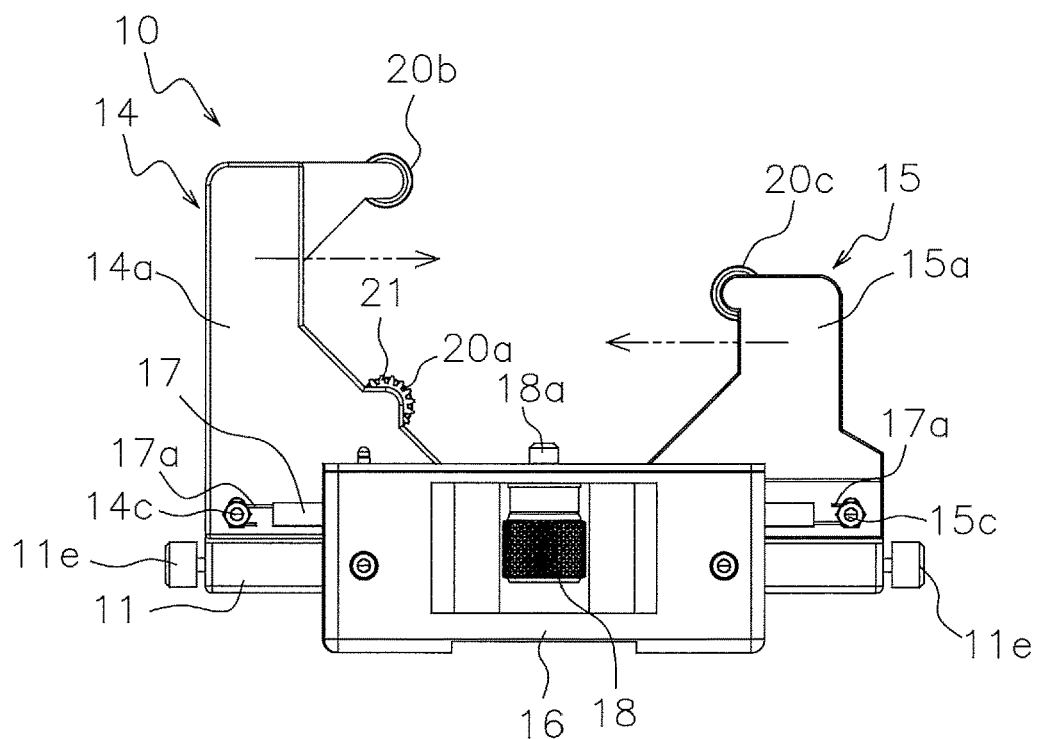
FIG. 6B is a rear view of the zoom ring drive device in FIG. 4.

As shown in FIGS. 6A and 6B, the fixing screws 11*e* are provided on the short-side surfaces on both sides of the main body portion 11*a*, and when turned clockwise, restrict the movement of the guide units 14 and 15 along the guide shafts 12*a* and 12*b*.

Figure 7A:
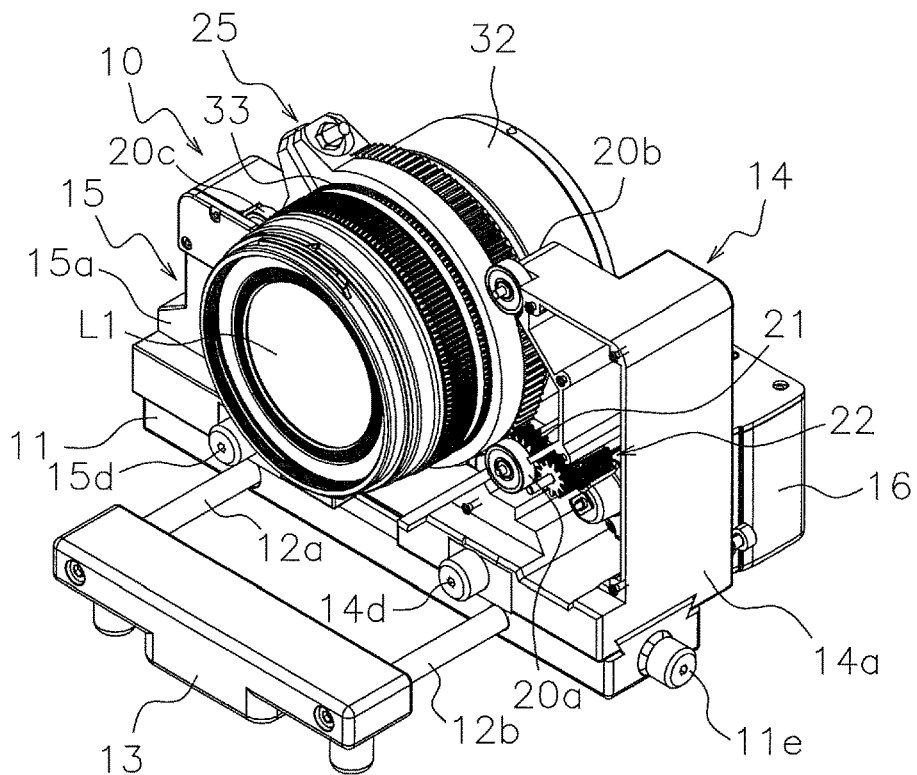
FIG. 7A is an oblique view showing a state in which the lens barrel has been set in the zoom ring drive device of FIG. 4.
Figure 7B:
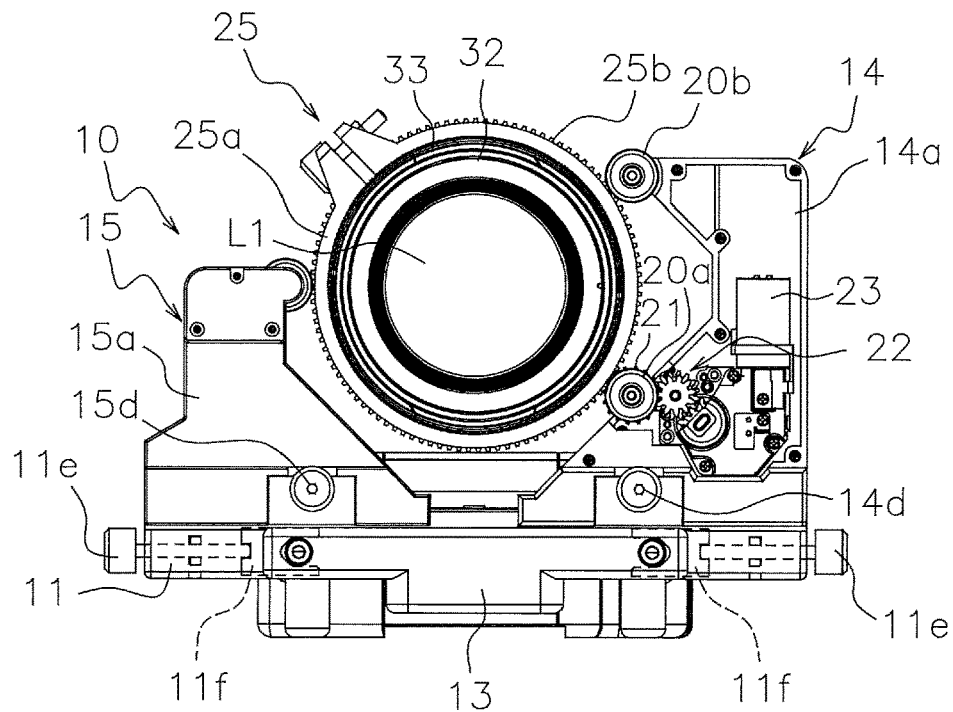
FIG. 7B is a front view of FIG. 7A.

As shown in FIG. 7B, the fixing members 11*f* are provided at positions inside the main body portion 11*a* that allow contact with the guide shafts 12*a* and 12*b*. When the fixing screws 11*e* are turned clockwise, the fixing members 11*f* are pressed in the direction of being pressed against the guide shafts 12*a* and 12*b* by the distal ends of the fixing screws 11*e*.

Consequently, the turning of the fixing screws 11*e* restricts the guide units 14 and 15 from moving back and forth along the guide shafts 12*a* and 12*b* in the optical axis direction, and allowing for the temporary positioning of the guide units 14 and 15, etc.

As shown in FIG. 5, the guide shafts 12*a* and 12*b* are provided substantially parallel to each other in the optical axis direction. The first ends of the guide shafts 12*a* and 12*b* are fixed on the front unit 13 side, and the second ends on the opposite side from the first ends are fixed on the base unit 16 side. The guide shafts 12*a* and 12*b* are respectively inserted into the slot 11*b* and the through-hole 11*c* so as to pass through the guide unit 11.

As shown in FIG. 1, etc., the front unit 13 is disposed on the side nearest the subject in the zoom ring drive device 10 in a state in which the camera 30 has been set. The front unit 13 supports the first end side of the guide shafts 12*a* and 12*b* so that the guide unit 11 can move along the guide shafts 12*a* and 12*b* toward and away from the base unit 16.

As shown in FIGS. 6A and 6B, the guide unit (second guide unit) 14 is provided so as to be able to slide along the upper surface of the guide unit 11 in a direction perpendicular to the optical axis direction, and is disposed to the side of the lens barrel 32 when the camera 30 has been set in place. As shown in FIG. 5, the guide unit 14 has a main body portion 14*a*, a rail portion 14*b*, a latched portion 14*c*, and a fixing screw (second fixing portion) 14*d*.

As shown in FIG. 5, the main body portion 14*a* is a member having a substantially cuboid shape, and supports the rollers 20*a* and 20*b* in a rotatable state on the lower portion and the upper portion, respectively, of the surface on the side where the lens barrel 32 is held. Also, the rail portion 14*b* that engages with the rail portion 11*d* of the guide unit 11 (described above) is provided on the bottom surface side of the main body portion 14*a*. Furthermore, as shown in FIGS. 7A and 7B, the main body portion 14*a* is provided with a gearbox that includes the speed reducer 22, the DC motor 23, and so on in an internal space.

As shown in FIG. 5, the rail portion 14*b* is a concave portion formed on the bottom surface side of the main body portion 14*a*, and engages with the convex rail portion 11*d* of the guide unit 11 (described above). Consequently, the guide unit 14 can move along the lengthwise direction of the guide unit 11 in a direction perpendicular to the optical axis direction.

As shown in FIGS. 5 and 6B, the latched portion 14*c* is a protruding portion provided on the side surface of the main body portion 14*a* that is opposite the base unit 16, and to which one end (latching portion 17*a*) of the spring 17 (discussed below) is latched.

As shown in FIG. 5, the fixing screw 14*d* is provided on the side surface of the main body portion 14*a* that is on the opposite side from the latched portion 14*c*. When turned clockwise, the fixing screw 14*d* restricts the movement of the guide unit 11 along the lengthwise direction of the guide unit 14.

Consequently, the guide unit 14 can be temporarily fixed at a position where the lens barrel 32 is sandwiched from both sides together with the guide unit 15 in a well-balanced manner.

The guide unit (third guide unit) 15 is disposed opposite the guide unit 14, and supports the outer peripheral surface of the lens barrel 32 between itself and the guide unit 14. As shown in FIGS. 6A and 6B, the guide unit 15 is provided in a state of being slidable along the upper surface of the guide unit 11 in a direction perpendicular to the optical axis direction, and is disposed to the side of the lens barrel 32 when the camera 30 has been set. As shown in FIG. 5, the guide unit 15 has a main body portion 15*a*, a rail portion 15*b*, a latched portion 15*c*, and a fixing screw 15*d*.

As shown in FIG. 5, the main body portion 15*a* is a member having a substantially cuboid shape, and rotatably supports a roller 20*c* on the upper portion of the surface on the side where the lens barrel 32 is held. Also, the rail portion 15*b* that engages with the rail portion 11*d* of the guide unit 11 (described above) is provided on the bottom surface side of the main body portion 15*a*.

As shown in FIG. 5, the rail portion 15*b* is a concave portion formed on the bottom surface side of the main body portion 15*a*, and engages with the convex rail portion 11*d* of the guide unit 11 (described above). Consequently, the guide unit 15 can move along the lengthwise direction of the guide unit 11 in a direction perpendicular to the optical axis direction.

As shown in FIG. 6B, the latched portion 15*c* is a protruding portion provided on the side surface of the main body portion 15*a* that is opposite the base unit 16, to which is latched the other end (latching portion 17*a*) of the spring 17 (discussed below).

Consequently, the ends of the spring 17 are latched to the main body portions 14*a* and 15*a*, so when the guide units 14 and 15 are moved away from each other, a repulsive force, that is, a biasing force toward each other, is imparted to these.

As shown in FIG. 5, the fixing screw 15*d* is provided on the side surface of the main body portion 15*a* on the opposite side from the latched portion 15*c*. When turned clockwise, the fixing screw 15*d* restricts the movement of the guide unit 11 along the lengthwise direction of the guide unit 11.

Consequently, the guide unit 14 can be temporarily fixed at a position where the lens barrel 32 is sandwiched from both sides together with the guide unit 14 in a well-balanced manner.

The base unit 16 is connected to the guide unit 11 in a state of being relatively movable in the optical axis direction, and the camera body 31 is placed on the upper surface thereof as shown in FIG. 2B, etc.

As shown in FIG. 5, the main body portion 16*a* has a substantially cuboid shape, and on the front surface side thereof there are provided insertion holes 16*b* into which the guide shafts 12*a* and 12*b* are inserted and fixed at one end.

As shown in FIG. 5, the insertion holes 16*b* are provided near the left and right ends on the front surface of the main body portion 16*a*, and the guide shafts 12*a* and 12*b* are inserted and fixed therein.

The spring (spring member) 17 has a first end (latching portion 17*a*) that is connected to the guide unit 14, and a second end (latching portion 17*a*) that is connected to the guide unit 15. The spring 17 applies a tensile force that moves the guide unit 14 and the guide unit 15 in the direction of sandwiching the lens barrel 32.

The latching portions 17*a* are provided at the two ends of the spring 17, and are latched to the latched portions 14*c* and 15*c* provided on the side surfaces of the guide units 14 and 15, respectively.

Here, in a steady state before the lens barrel 32 is sandwiched between the guide units 14 and 15, the length of the spring 17 is less than the spacing of the latched portions 14*c* and 15*c* in a state in which the lens barrel 32 is sandwiched between the guide units 14 and 15.

Consequently, in a state in which the camera 30 is placed on the zoom ring drive device 10, and the outer peripheral surface of the lens barrel 32 is indirectly supported at three points by the rollers 20*a*, 20*b*, and 20*c* via the ring gear 25, the spring 17 is in an extended state and imparts a biasing force in the direction of moving the guide units 14 and 15 closer together. Therefore, when the camera 30 is placed in the zoom ring drive device 10, the lens barrel 32 is stably supported at three points so that the ring gear 25 wound around its outer peripheral surface is pressed by the three rollers 20*a*, 20*b*, and 20*c* due to the biasing force of the spring 17.

As shown in FIG. 5, the fixing screw 18 is inserted from the bottom surface side of the main body portion 16*a* of the base unit 16, and the threaded portion 18*a* at the distal end thereof protrudes from the upper surface of the base unit 16.

The threaded portion 18*a* fixes the camera body 31 to the base unit 16 by being threaded into a screw hole (not shown) provided on the bottom surface of the camera body 31, in a state in which the camera body 31 has been placed on the upper surface of the base unit 16.

As shown in FIGS. 7A and 7B, the three rollers 20*a*, 20*b*, and 20*c* are provided to the guide unit 14 and the guide unit 15 so as to be rotatable about the rotational axes thereof, and provide three-point support in a state of being in contact with the outer peripheral surface of the ring gear 25 wound around the outer peripheral surface of the lens barrel 32 in a state of being incapable of relative rotation. That is, the three rollers 20*a*, 20*b*, and 20*c* support the outer peripheral surface of the lens barrel 32 indirectly, via the ring gear 25.

As shown in FIGS. 7A and 7B, the roller (first roller) 20*a* is disposed at the lower portion of the guide unit 14, in a rotatable state and coaxially with the drive gear 21 in the guide unit 14. The roller 20*a* supports the outer peripheral surface of the lens barrel 32 via the ring gear 25.

As shown in FIGS. 7A and 7B, the roller (second roller) 20*b* is disposed at the upper part of the guide unit 14, in a rotatable state at the opposite position from that of the roller 20*a*, sandwiching the horizontal plane including the optical axis of the lens L1 included in the lens barrel 32. The roller 20*b* supports the outer peripheral surface of the lens barrel 32 via the ring gear 25.

As shown in FIGS. 7A and 7B, the roller (third roller) 20*c* is disposed at the upper part of the guide unit 15, in a rotatable state on the opposite side from the first roller, sandwiching the lens barrel 32 therebetween. The roller 20*c* supports the outer peripheral surface of the lens barrel 32 via the ring gear 25.

As shown in FIG. 5, the drive gear 21 is disposed at a position adjacent to the roller 20*a* in the guide unit 14 so as to be coaxial with the roller 20*a*, which is provided in a rotatable state. As shown in FIGS. 7A and 7B, the drive gear 21 is provided at a position in the guide unit 14 where the drive gear 21 engages with the gear portion 25*b* of the ring gear 25 wound around the outer peripheral surface of the zoom ring 33. The drive gear 21 turns the zoom ring 33 by rotating in a state in which the rotational drive force applied from the DC motor 23 is transmitted via the speed reducer 22, and the gear portion is meshed with the gear portion 25*b* of the ring gear 25 wound around the zoom ring 33.

That is, the drive gear 21 is connected to the zoom ring 33 indirectly via the ring gear 25, and the rotational drive force is transmitted to the zoom ring 33 via the ring gear 25.

As shown in FIGS. 7A and 7B, the speed reducer 22 is provided inside a gearbox in the internal space of the guide unit 14, and includes a plurality of reduction gears that transmit the rotational drive force applied from the DC motor 23 to the drive gear 21.

As shown in FIGS. 7A and 7B, the DC motor 23 is provided in a gearbox in the internal space of the guide unit 14, and is controlled by the control unit 24 so as to rotationally drive the drive gear 21 (see FIG. 3).

Figure 8A:
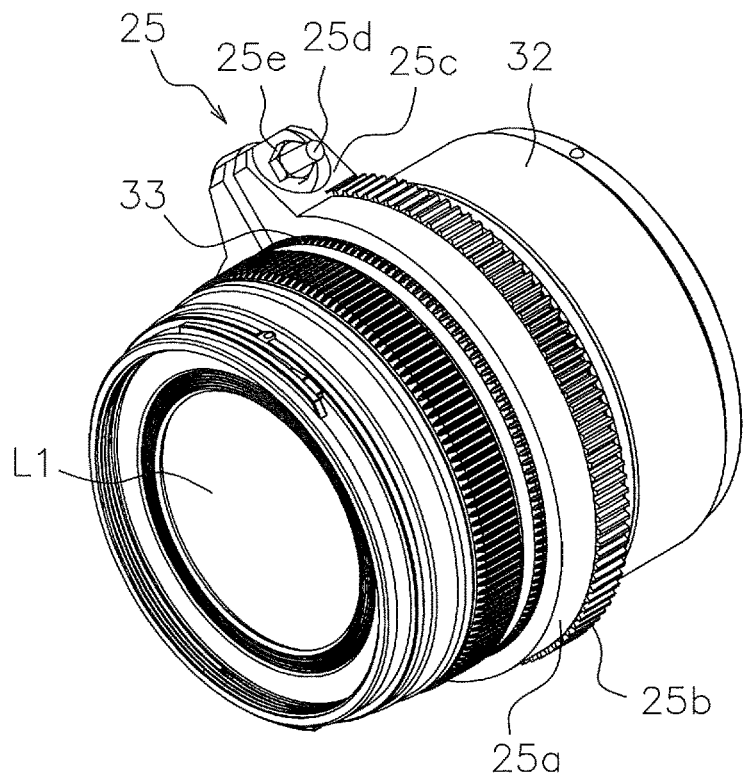
FIG. 8A is an oblique view showing a state in which a ring gear has been attached to the outer peripheral surface of a zoom ring of the lens barrel mounted on the camera body of a camera in FIG. 1, etc.
Figure 8B:
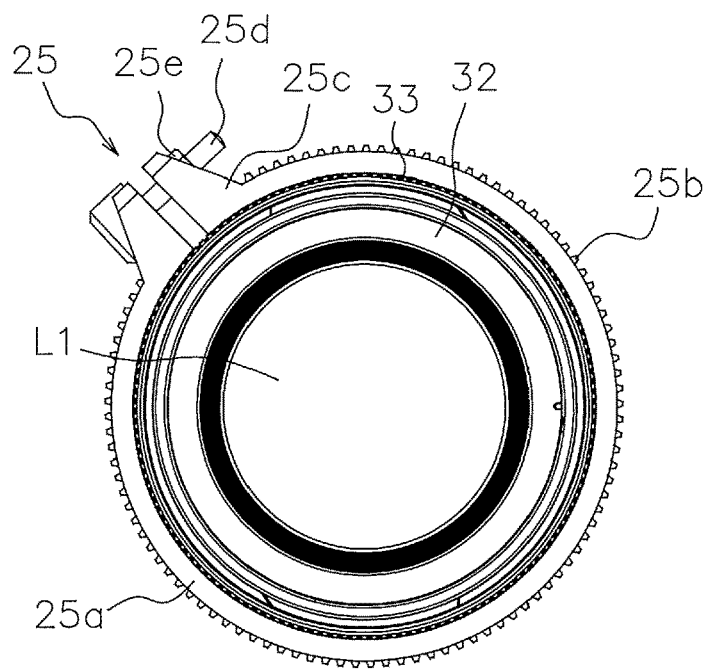
FIG. 8B is a front view of FIG. 8A.
Figure 9A:
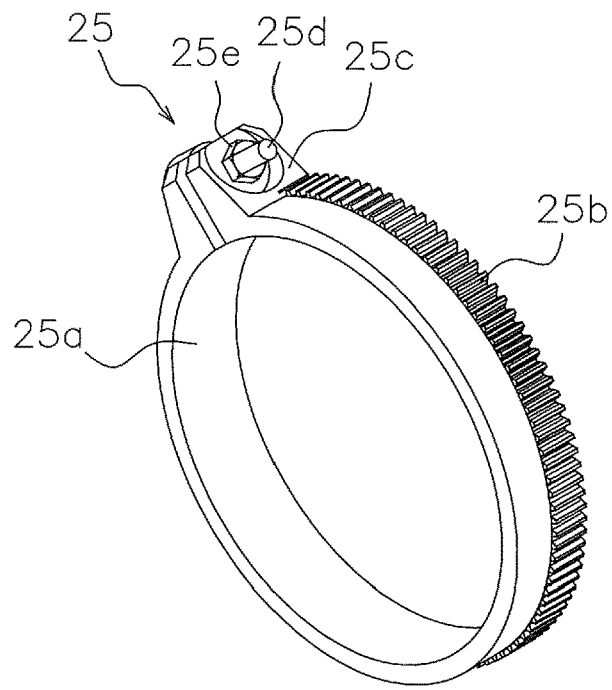
FIG. 9A is an oblique view of the configuration of a ring gear attached to the outer peripheral surface of the zoom ring of the lens barrel in FIG. 8A.
Figure 9B:
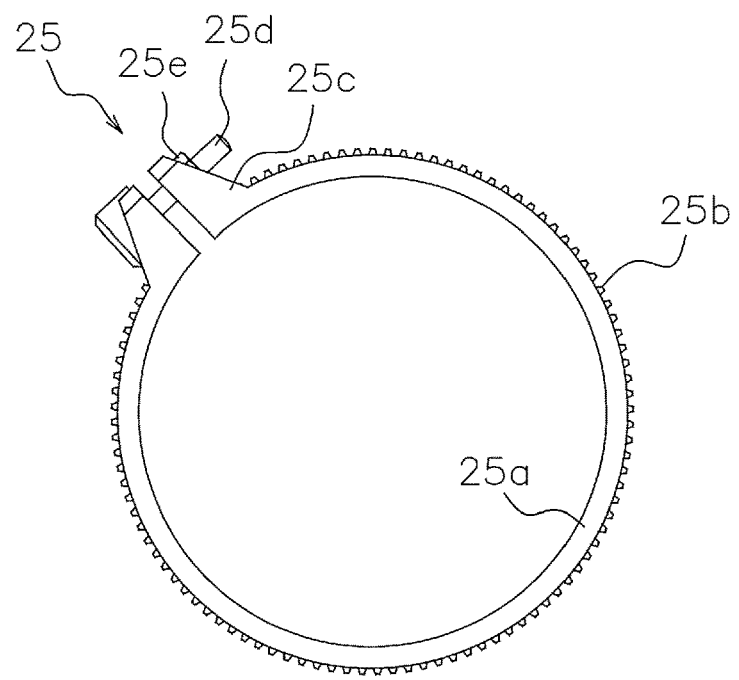
FIG. 9B is a front view of FIG. 9A.

As shown in FIGS. 8A and 8B, the ring gear 25 is removably mounted to the outer periphery of the zoom ring 33 of the lens barrel 32 in a state of being incapable of relative rotation. As shown in FIGS. 9A and 9B, the ring gear 25 has a main body portion 25*a*, a gear portion 25*b*, a fastening portion 25*c*, a bolt 25*d*, and a nut 25*e*.

As shown in FIGS. 9A and 9B, the main body portion 25*a* is a substantially annular member, and is formed from a resin such as PC (polycarbonate) or ABS (acrylonitrile butadiene styrene). The main body portion 25*a* has on its outer peripheral surface side a gear portion 25*b* that meshes with the drive gear 21. Also, the outer peripheral surface side of the main body portion 25*a* has a contact surface that makes contact with the three rollers 20*a*, 20*b*, and 20*c* at a position adjacent to the gear portion 25*b*.

The main body portion 25*a* may be textured on the inner peripheral surface of a substantially annular shape. In this case, the texturing increases the frictional force generated between the inner peripheral surface of the ring gear 25 and the outer peripheral surface (gear portion 25*b*) of the zoom ring 33, so the ring gear 25 can be attached in a state in which there is unlikely to be rotation relative to the zoom ring 33.

As shown in FIGS. 9A and 9B, the gear portion 25*b* is formed on a part of the outer peripheral surface of the substantially annular main body portion 25a, and rotates along with the zoom ring 33 when the drive gear 21 rotates in a state of being meshed with the drive gear 21.

As shown in FIGS. 9A and 9B, the fastening portion 25c is provided in order to couple and fasten the divided ends of the substantially annular main body portion 25a. The fastening portion 25c fixes the ring gear 25 with respect to the outer peripheral surface of the zoom ring 33 when the bolt 25d is threaded into the nut 25e and tightened.

As shown in FIGS. 9A and 9B, the bolt 25d is inserted into a through-hole provided in the fastening portion 25c, and the threaded portion thereof is threaded into the nut 25e.

As shown in FIGS. 9A and 9B, the nut 25e is provided on the opposite side of the fastening portion 25c from the bolt head of the bolt 25d, and the threaded portion of the bolt 25d is threaded to tighten the fastening screw 25c.

The steps involved in placing the camera 30 in the zoom ring drive device 10 of this embodiment will now be described.

Figure 10:
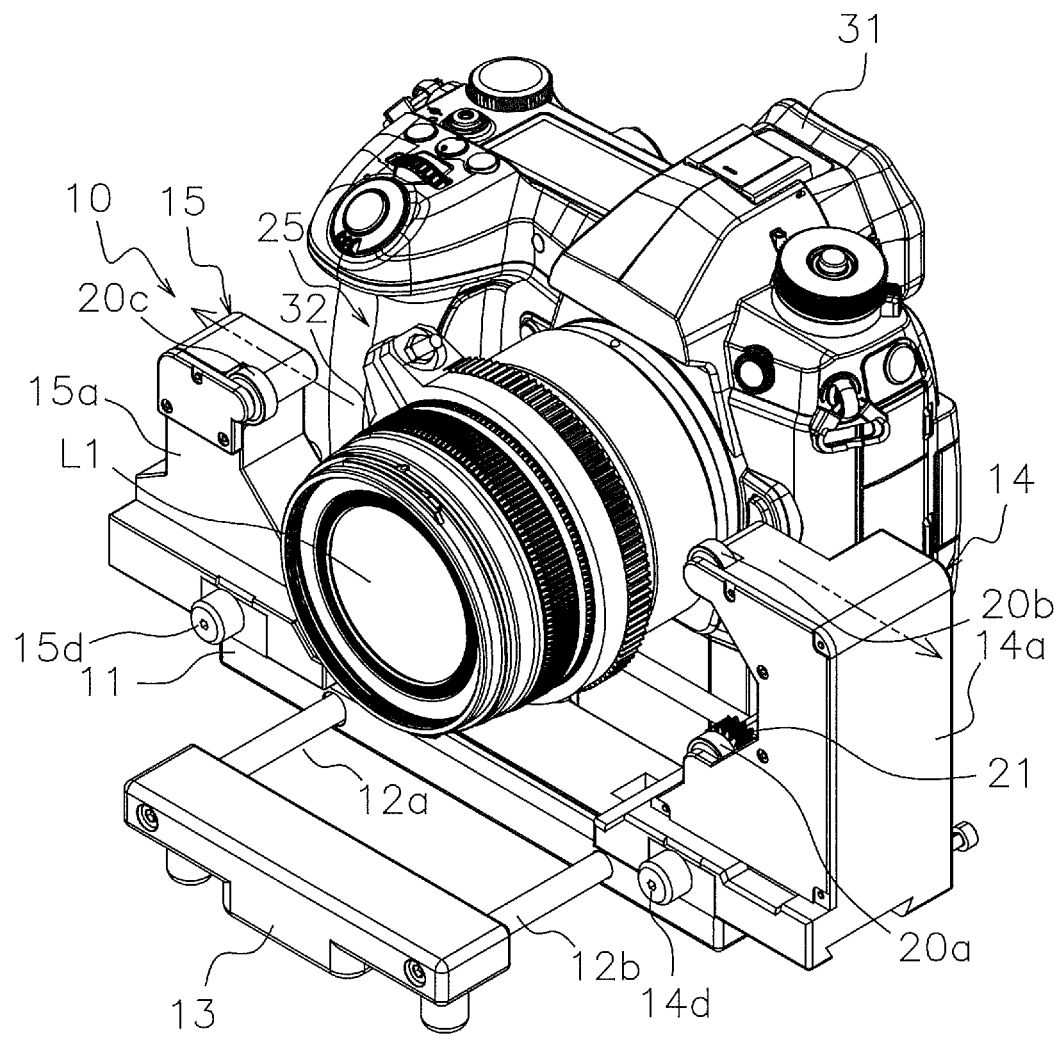
FIG. 10 is an oblique view showing the state before the camera is set and held in the zoom ring drive device of FIG. 4.

In the zoom ring drive device 10 of this embodiment, as shown in FIG. 10, when the camera 30 is put in place, first the camera body 31 is placed on the upper surface of the base unit 16, and the camera body 31 is fixed to the upper surface of the base unit 16 by the fixing screw 18 (see FIG. 6B). Then, the guide units 14 and 15 move away from each other to sandwich the outer peripheral surface of the lens barrel 32, after which positioning in the optical axis direction is performed.

Figure 11:
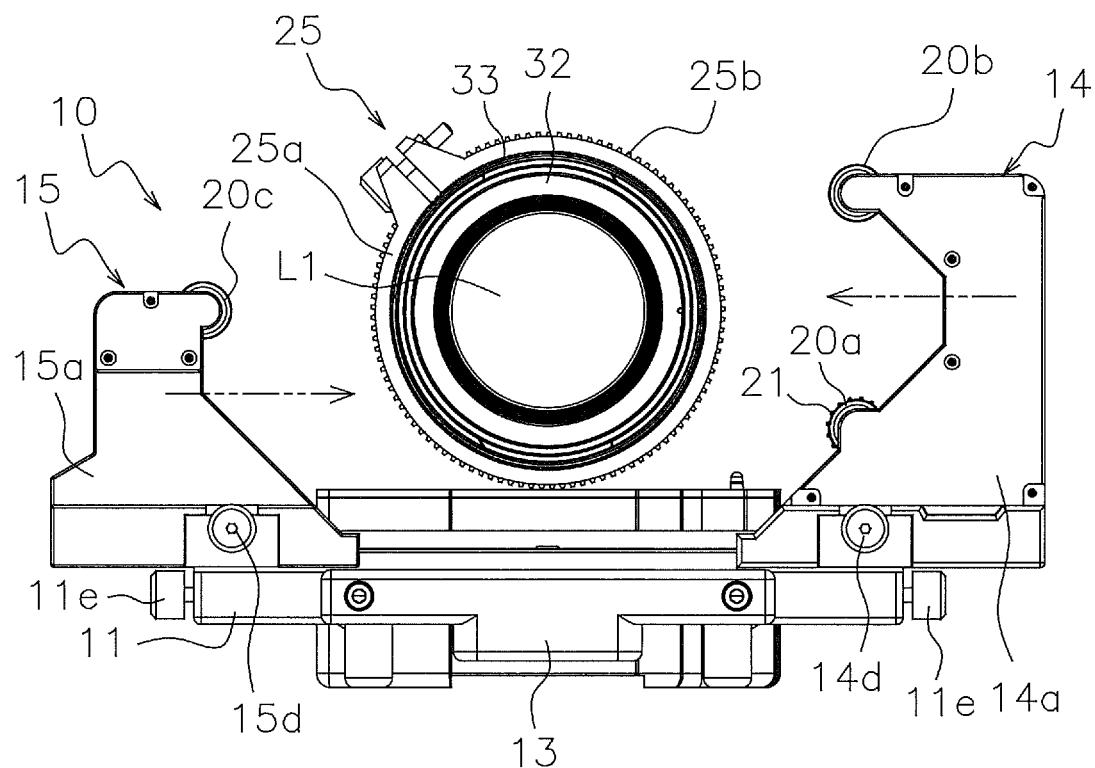
FIG. 11 is a front view of FIG. 10.

At this point, as shown in FIG. 11, the guide units 14 and 15 are subjected to a force in the direction of moving toward each other (see the two-dot chain line in the drawing) by the biasing force applied from the spring 17.

When the outer peripheral surface of the lens barrel 32 is sandwiched between the guide units 14 and 15, the guide unit 11 is moved in the optical axis direction along the guide shafts 12a and 12b, and the drive gear 21 is engaged with the gear portion 25b of the ring gear 25. Furthermore, as shown in FIGS. 12 and 13, the fixing screws 11e are turned clockwise (see the one-dot chain line in the drawing) to perform positioning in the optical axis direction at positions where the three rollers 20a, 20b and 20c support the outer peripheral surface of the main body portion 25a of the ring gear 25.

Figure 12:
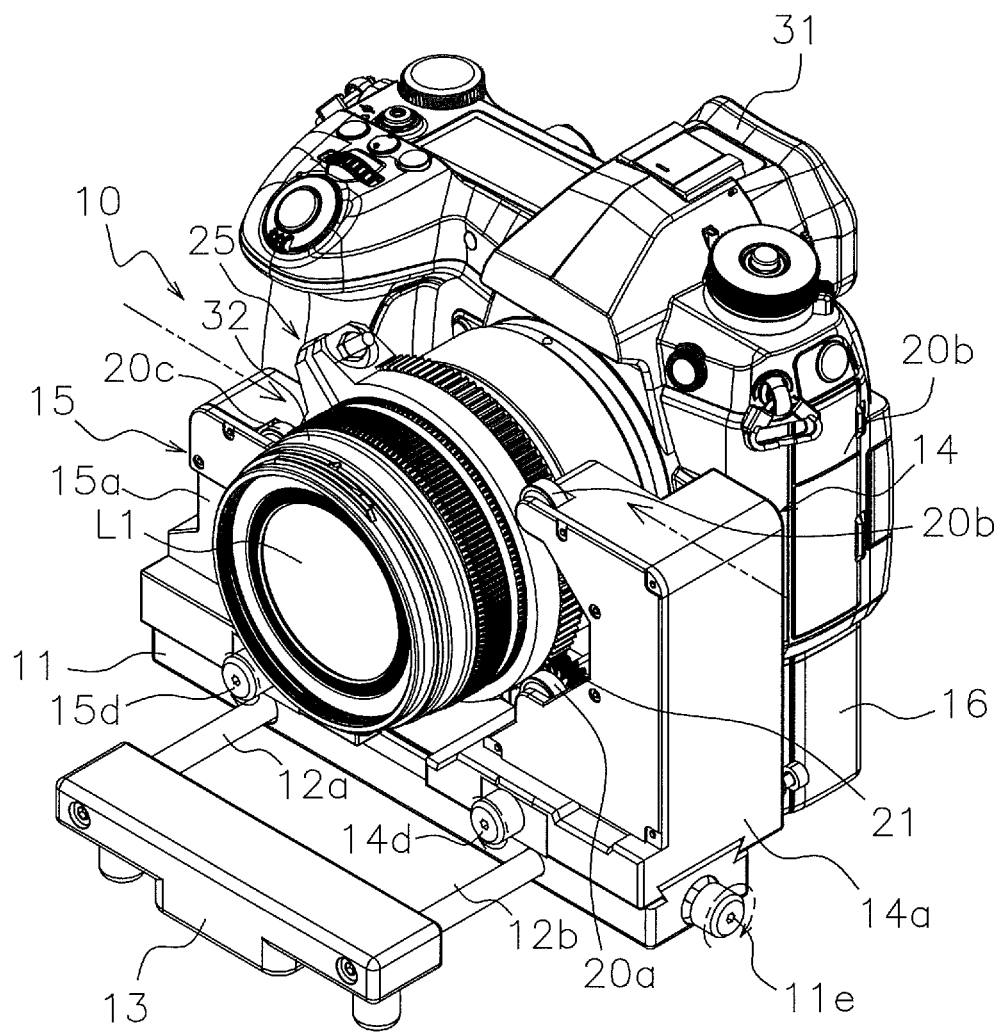
FIG. 12 is an oblique view showing a state in which the camera is set and held in the zoom ring drive device of FIG. 4.
Figure 13:
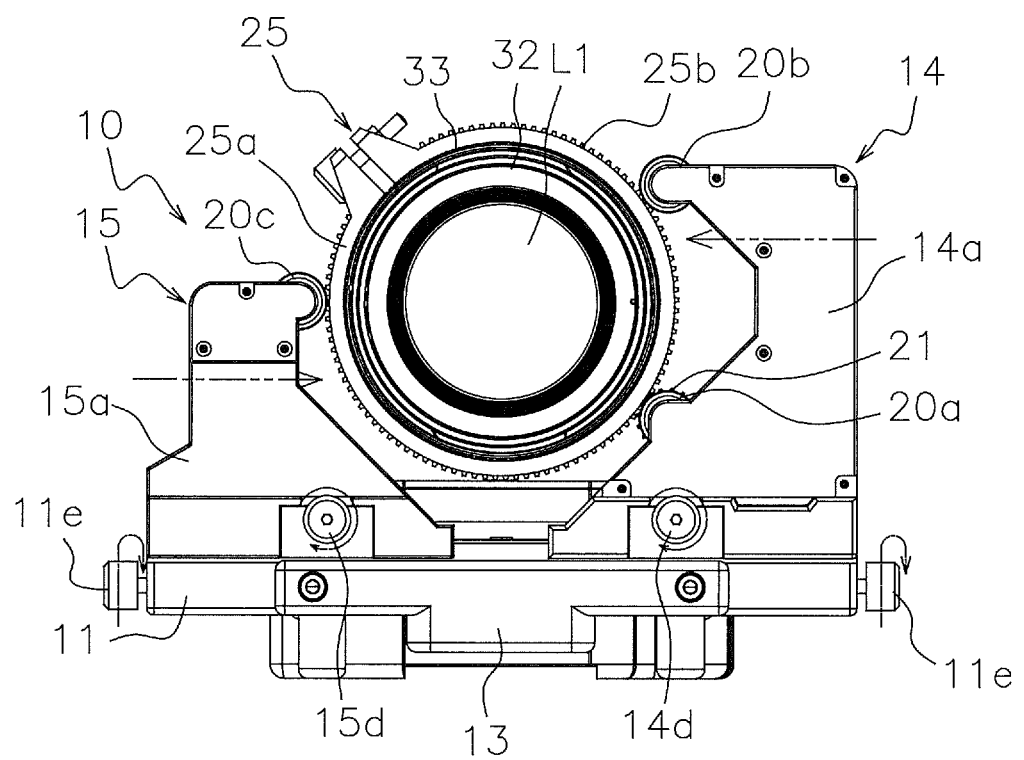
FIG. 13 is a front view of FIG. 12.

Then, as shown in FIGS. 12 and 13, the fixing screws 14d and 15d are turned clockwise at positions (see the one-dot chain line in the drawing) to perform temporary positioning in a direction perpendicular to the optical axis direction at positions where the three rollers 20a, 20b and 20c stably support the lens barrel 32 at three points.

With the zoom ring drive device 10 of this embodiment, as described above, the three guide units 11, 14, and 15 are placed in the desired positions in a direction perpendicular to the optical axis direction and the optical axis direction of the lens L1, to match the size of the lens barrel 32. The outer peripheral surface of the lens barrel 32 (ring gear 25) is supported at three points by the three rollers 20a, 20b, and 20c included in the guide units 14 and 15, which can slide in a direction perpendicular to the optical axis direction.

Figure 14:
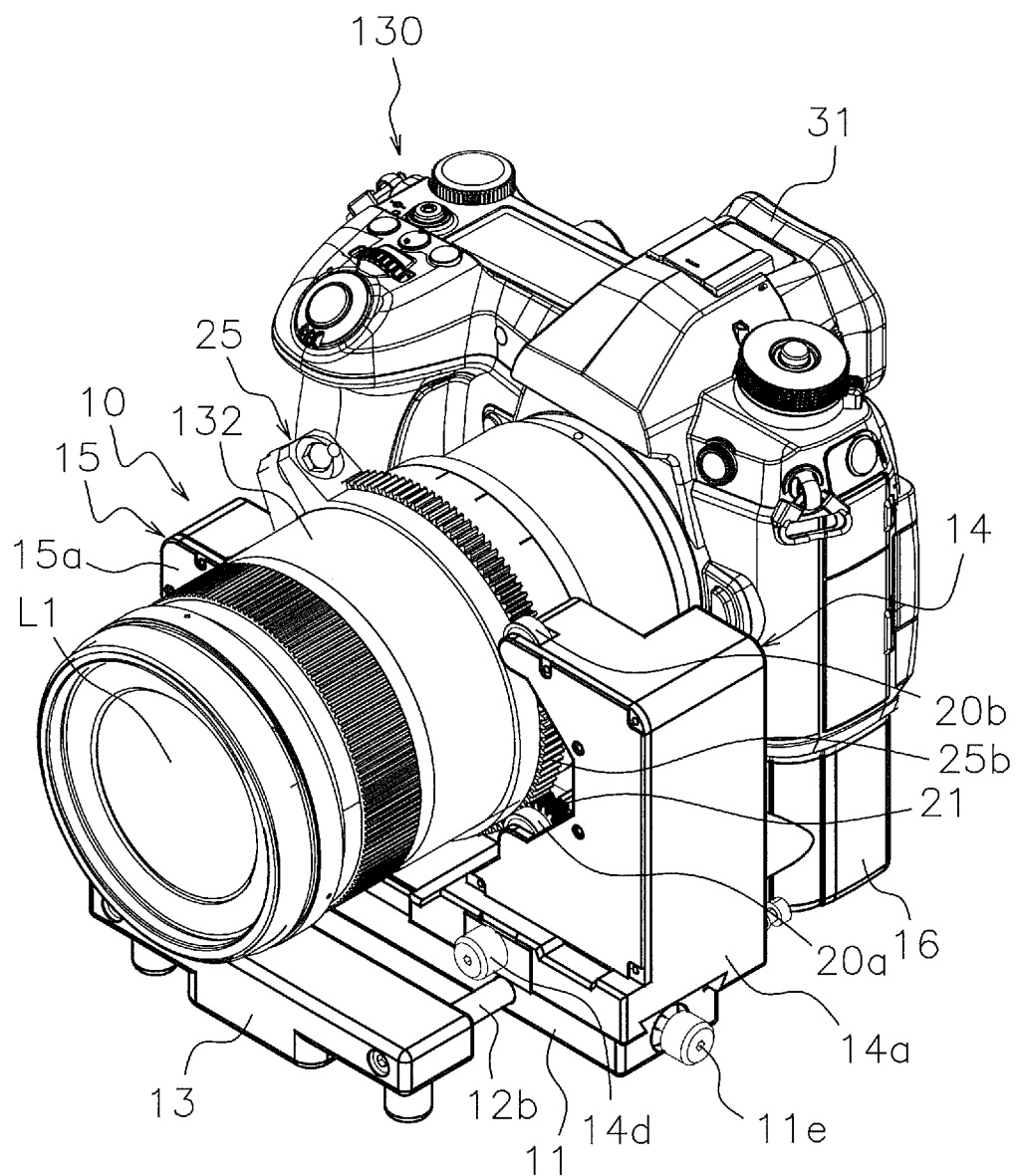
FIG. 14 is an overall oblique view showing a camera in which a lens barrel longer than the one in FIG. 1 has been mounted to the camera body.

As a result, as shown in FIG. 14, even when a lens barrel 132 whose length and outside diameter in the optical axis direction are greater than those of the lens barrel 32 mounted on the camera body 31 of FIG. 1 is attached to the camera 130 mounted on the camera body 31, the guide units 11, 14, and 15 can stably support the lens barrel 32 at three points by moving to the optimum positions in the optical axis direction and a direction perpendicular to the optical axis direction, according to the size of the lens barrel 132.

Consequently, regardless of the size of the lens barrel, the guide units 11, 14 and 15 can be moved so that the drive gear 21 is rotationally driven in a state in which the lens barrel is stably supported at three points by the three rollers 20a, 20b and 20c, which means that the zoom ring 33 of lens barrels of various sizes can be rotationally driven at the desired timing and speed via the ring gear 25.

(3) Support Structure of Guide Shaft 12a in Slot 11b

Figure 15A:
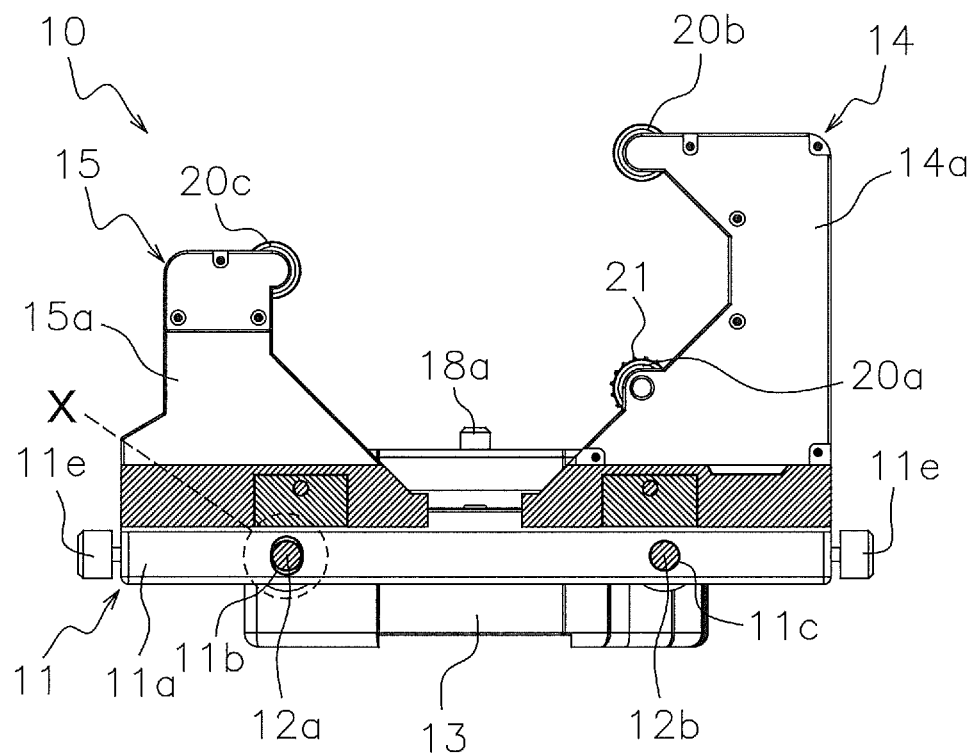
FIG. 15A is a cross-sectional view of the configuration near a slot formed in a guide unit of the zoom ring drive device in FIG. 4, etc.
Figure 15B:
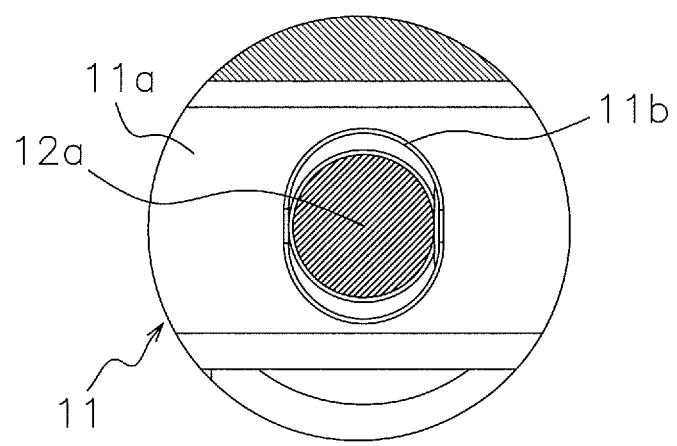
FIG. 15B is a detail view of the X portion in FIG. 15A.

With the zoom ring drive device 10 of this embodiment, as shown in FIGS. 15A and 15B, the through-hole of the guide unit 11 into which is inserted the guide shaft 12a (one of the two guide shafts 12a and 12b that guide the guide unit 11 in the optical axis direction) is a slot 11b that is longer in the substantially vertical direction.

On the other hand, the through-hole 11c of the guide unit 11 into which the guide shaft 12b is inserted is a circular through-hole.

Consequently, the guide unit 11 supported by the two guide shafts 12a and 12b is supported in a state of being able to pivot up and down in the lengthwise range of the slot 11b, centered on the guide shaft 12b inserted in the circular through-hole 11c.

That is, the guide unit 11 pivots up and down within the range of the slot 11b on the guide shaft 12a side, centered on the guide shaft 12b side.

As a result, when the lens barrel 32 is supported at three points by the guide units 14 and 15 so as to be sandwiched from both sides by using the tensile force of the spring 17, the guide unit 11 to which the guide units 14 and 15 are attached pivots within the range of the slot 11b, which allows the lens barrel 32 to be supported in a stable position.

Main Feature 1

As shown in FIGS. 7A and 7B, the zoom ring drive device 10 of this embodiment comprises the guide unit 11, the guide unit 14, the drive gear 21, and the DC motor 23. The guide unit 11 slides along the optical axis direction of the lens L1 included in the lens barrel 32. The guide unit 14 is provided to the guide unit 11 and slides along a direction perpendicular to the optical axis direction. The drive gear 21 is provided in the guide unit 14 at a position in contact with the ring gear 25 wound around the zoom ring 33, and rotates the zoom ring 33 by rotating in a state of being in contact with the ring gear 25. The DC motor 23 is provided to the guide unit 14 and rotationally drives the drive gear 21.

Consequently, the guide unit 11, which is movable in the optical axis direction, and the guide unit 14, which is movable in a direction perpendicular to the optical axis direction, are disposed at suitable positions according to the size of the lens barrel 32, and rotationally drive the drive gear 21, which allows the rotation of the zoom ring 33 to be controlled.

As a result, mounting to the lens barrel 32 is possible regardless of the outside diameter of the lens barrel 32 or the length in the optical axis direction.

Embodiment 2

The zoom ring drive device (manually operated ring drive device) 110 according to another embodiment of the present disclosure will now be described with reference to FIGS. 16 to 18.

In this embodiment, those components having the same function, shape, and so forth as in Embodiment 1 will be numbered the same, and will not be described again.

Figure 16:
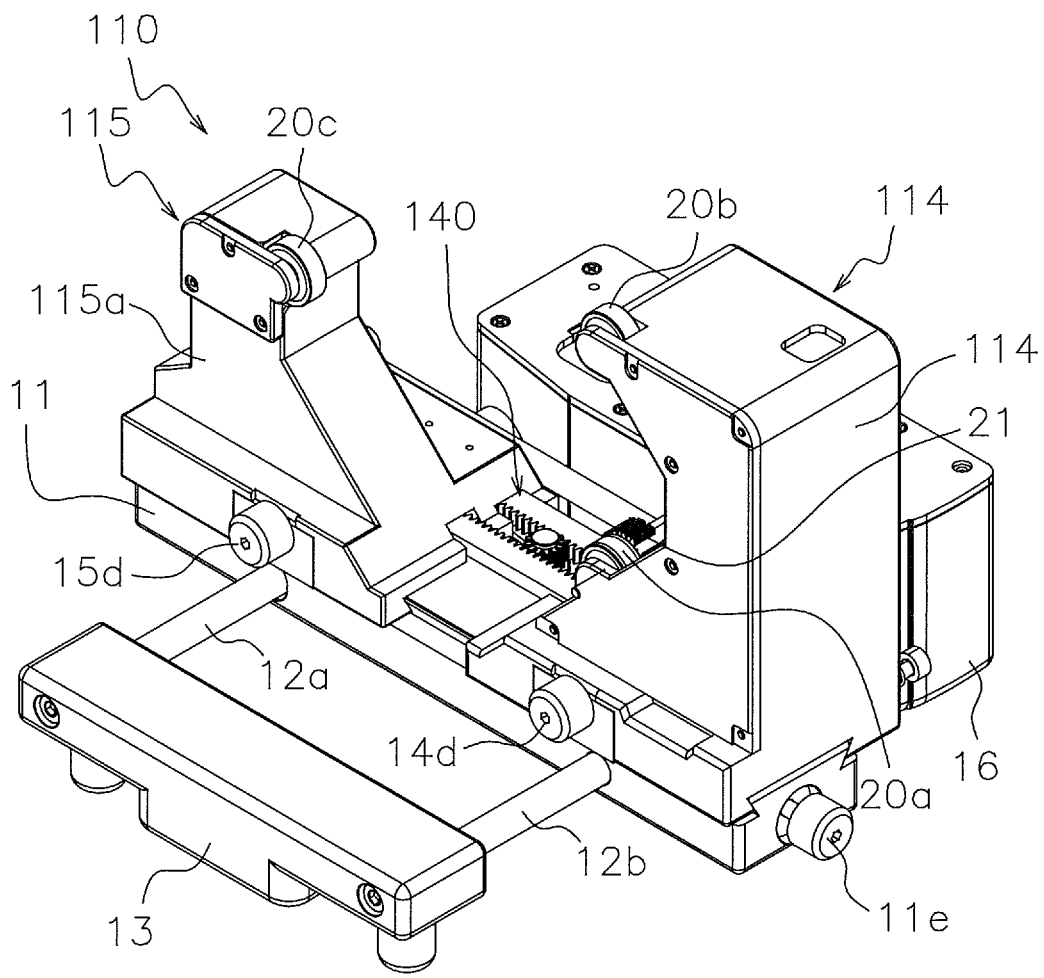
FIG. 16 is an overall oblique view showing the configuration of the zoom ring drive device according to another embodiment of the present disclosure.

As shown in FIG. 16, the zoom ring drive device 110 of this embodiment differs from the configuration of the zoom ring drive device 10 of Embodiment 1 in that it comprises a centering mechanism 140.

The zoom ring drive device 110 of this embodiment comprises a guide unit (first guide unit) 111, two guide shafts 12a and 12b, a front unit 13, a guide unit (second guide unit) 114, a guide unit (third guide unit) 115, a base unit 16, and a spring (spring member) 17, the guide unit 11 is able to move back and forth in the optical axis direction along the guide shafts 12a and 12b, and the guide units 114 and 115 are able to slide in a direction perpendicular to the optical axis on the upper surface of the guide unit 11, and in these respects is the same as the zoom ring drive device 10 of Embodiment 1. Movement of the guide unit 11 in the optical axis direction is restricted by the fixing screw 11e, movement of the guide unit 114 in a direction perpendicular to the optical axis direction is restricted by the fixing screw 11e, and movement of the guide unit 115 in a direction perpendicular to the axial direction is restricted by the fixing screw 15d, and these points are also the same as in Embodiment 1.

As shown in FIG. 16, the centering mechanism 140 is provided between the guide unit 114 and the guide unit 115, which are disposed at positions opposite each other, in a state of being able to slide in a direction perpendicular to the optical axis on the upper surface of the guide unit 11. The centering mechanism 140 is provided to hold the lens barrel 32 at a position at the center of the guide units 114 and 115 when the outer peripheral surface of the lens barrel 32 is sandwiched from both sides by the three rollers 20a, 20b, and 20c included the guide units 114 and 115.

Figure 17A:
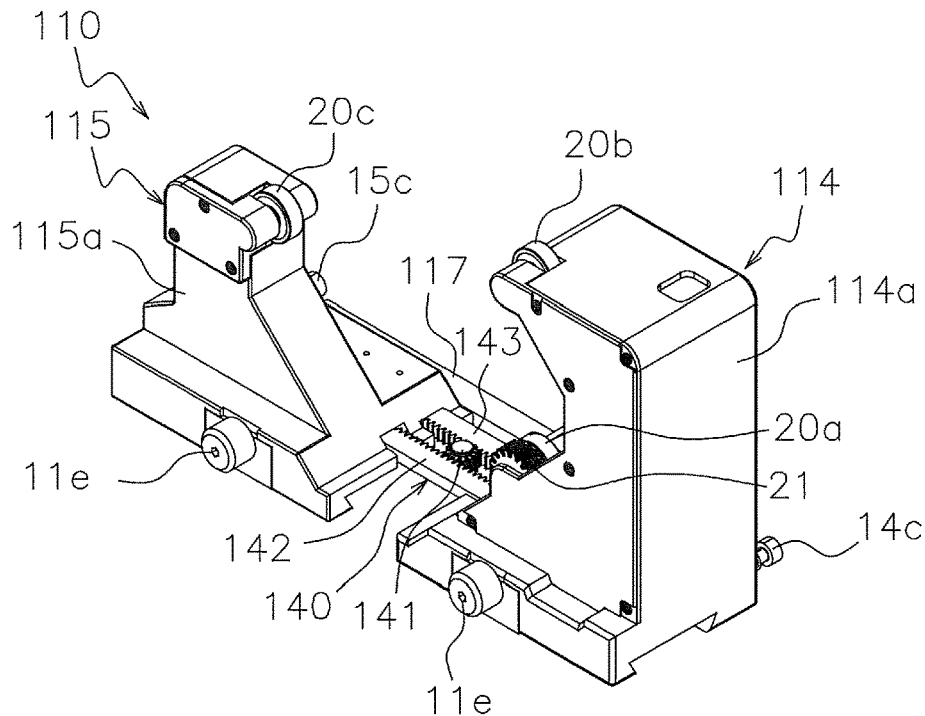
FIG. 17A is an oblique view showing the configuration around of a centering mechanism of the zoom ring drive device in FIG. 16.
Figure 17B:
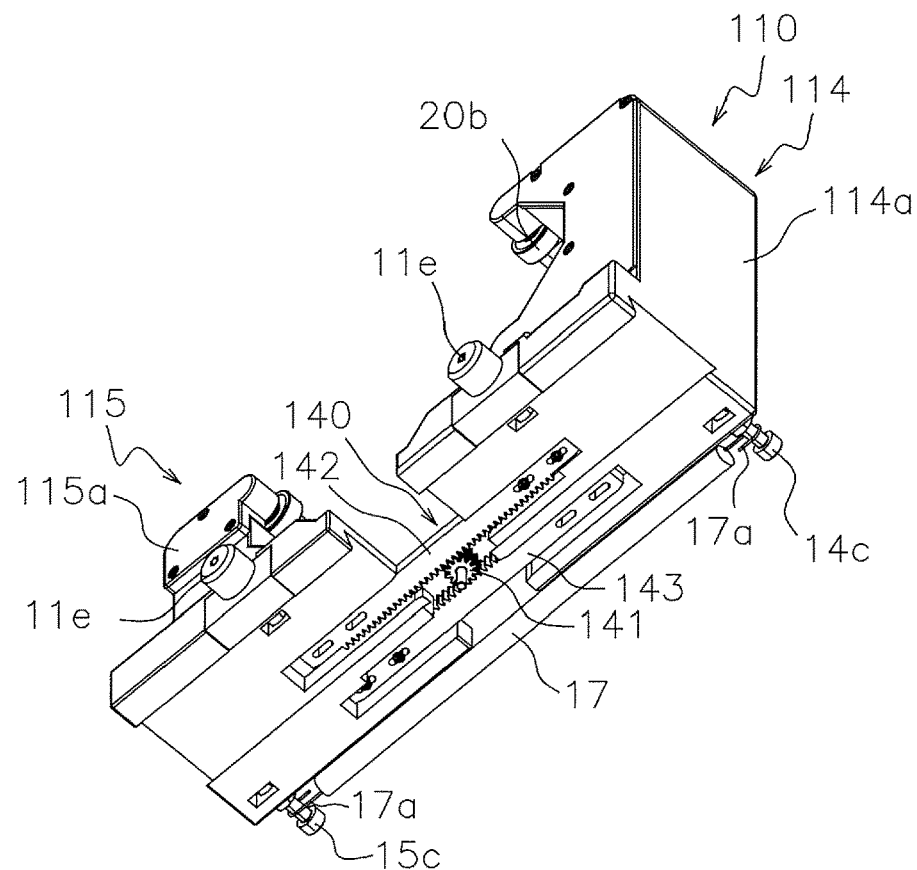
FIG. 17B is an oblique view of FIG. 17A as viewed from the bottom surface side.

As shown in FIGS. 17A and 17B, the centering mechanism 140 has a pinion 141, a rack 142, and a rack 143.

The pinion 141 is a rotary gear provided directly below the optical axis of the lens barrel 32 in a state in which the camera 30 has been placed in the zoom ring drive device 110, and as shown in FIGS. 17A and 17B, is provided between the guide unit 114 and the guide unit 115. The pinion 141 engages with the rack 142 on the guide unit 114 side and the rack 143 on the guide unit 115 side and rotates around a rotation shaft provided on the upper surface of the guide unit 11, thereby moving the guide units 114 and 115 in left and right symmetry in a direction perpendicular to the optical axis direction.

Figure 18:
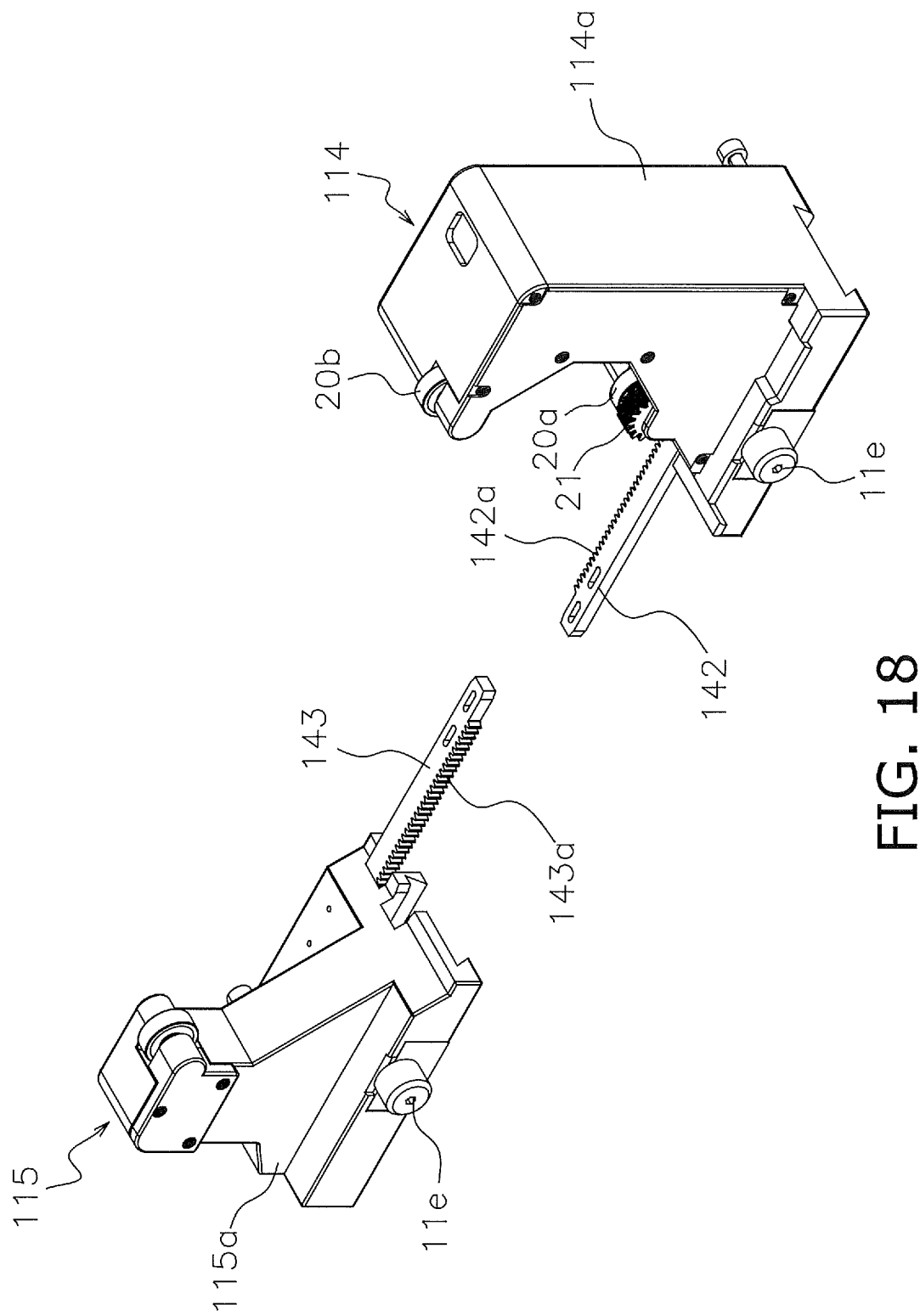
FIG. 18 is an oblique view showing the configuration around a rack included in the centering mechanism of the zoom ring drive device in FIG. 16.

As shown in FIG. 18, the rack 142 is formed so as to extend from the main body portion 114a of the guide unit 114 toward the guide unit 115 disposed at an opposing position. The rack 142 is provided to the extended portion on the surface that is opposite the pinion 141, and has a gear 142a that meshes with the pinion 141.

As shown in FIG. 18, the rack 143 is formed so as to extend from the main body portion 115a of the guide unit 115 toward the guide unit 114 disposed at an opposing position. The rack 143 is provided to the extended portion on the surface that is opposite the pinion 141, and has a gear 143a that meshes with the pinion 141.

Here, the guide units 114 and 115 that sandwich and support the lens barrel 32 are subjected to the biasing force of the spring 17 in the direction of moving closer together when the lens barrel 32 is put in place.

At this point, the guide units 114 and 115 are moved by the centering mechanism 140 in left and right symmetry around the pinion 141 provided near a point directly below the optical axis of the lens barrel 32. Therefore, the lens barrel 32 is supported in a well-balanced manner by the three rollers 20a, 20b, and 20c provided to the guide units 114 and 115.

Embodiment 3

The zoom ring drive device (manually operated ring drive device) 210 according to yet another embodiment of the present disclosure will now be described with reference to FIGS. 19 to 23.

In this embodiment, those components having the same function, shape, and so forth as in Embodiment 1 will be numbered the same, and will not be described again.

Figure 19:
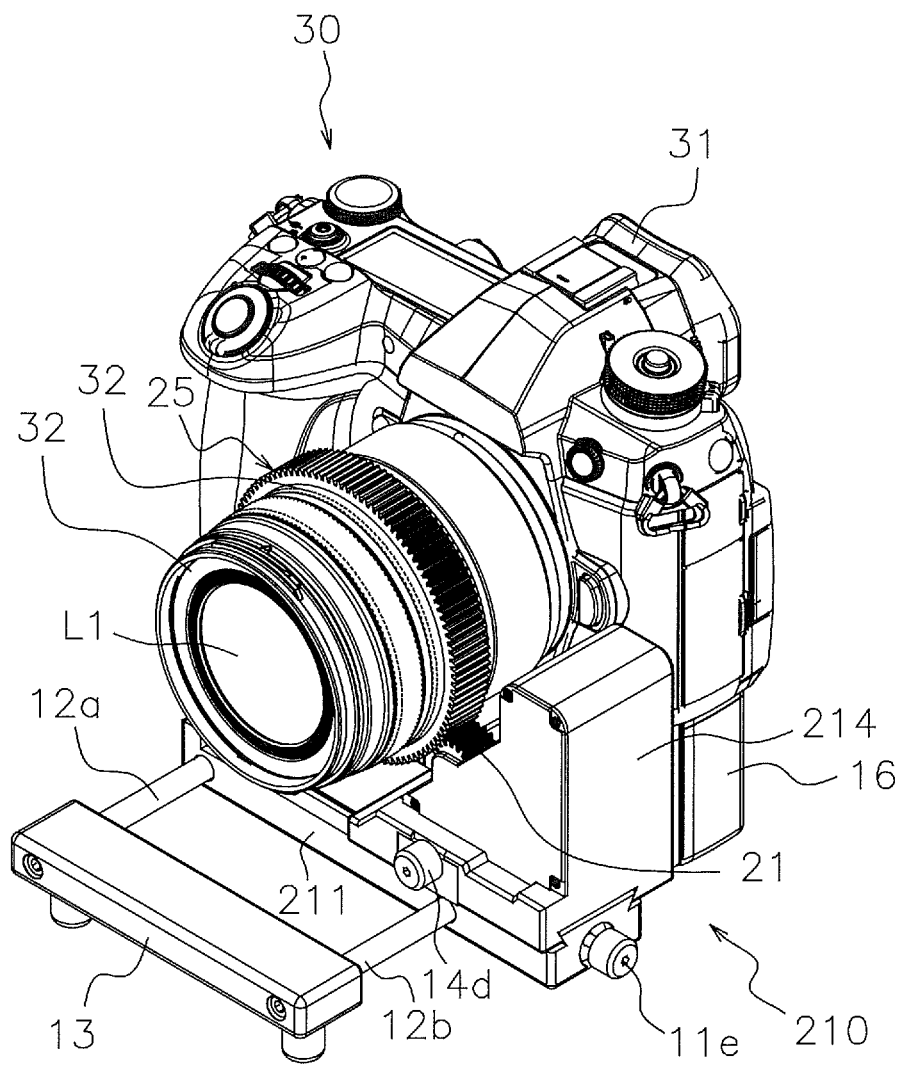
FIG. 19 is an overall oblique view showing the camera set in the zoom ring drive device according to another embodiment of the present disclosure.
Figure 20:
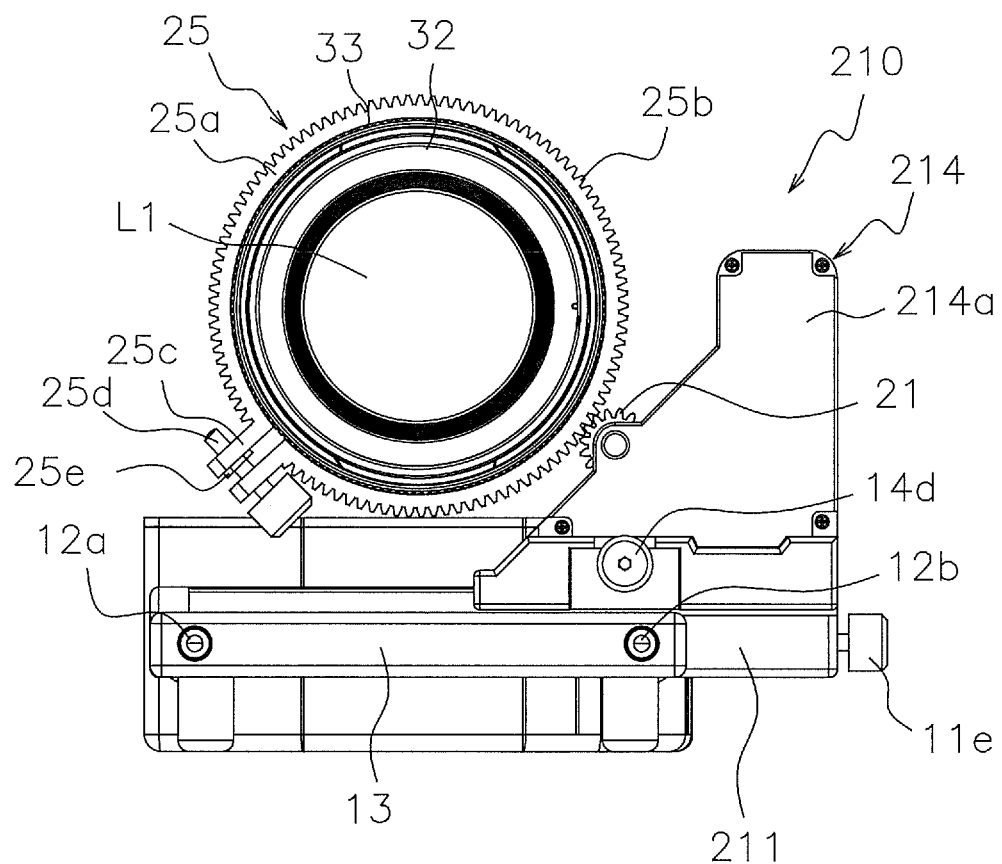
FIG. 20 is a front view of the zoom ring drive device in FIG. 19 as viewed from the lens barrel side.

As shown in FIG. 19, the zoom ring drive device 210 of this embodiment is similar to Embodiment 1 in that the drive gear 21 rotationally drives the zoom ring 33 via the ring gear 25 in a state in which the camera 30 has been placed so that the camera body 31 is on the upper surface of the base unit 16. However, with the zoom ring drive device 210 of this embodiment, as shown in FIGS. 19 and 20, the lens barrel 32 is supported at one point in the drive gear 21, which differs from the configuration of Embodiment 1 in which the three rollers 20a, 20b, and 20c are used to support the lens barrel 32 at three points.

Figure 21:
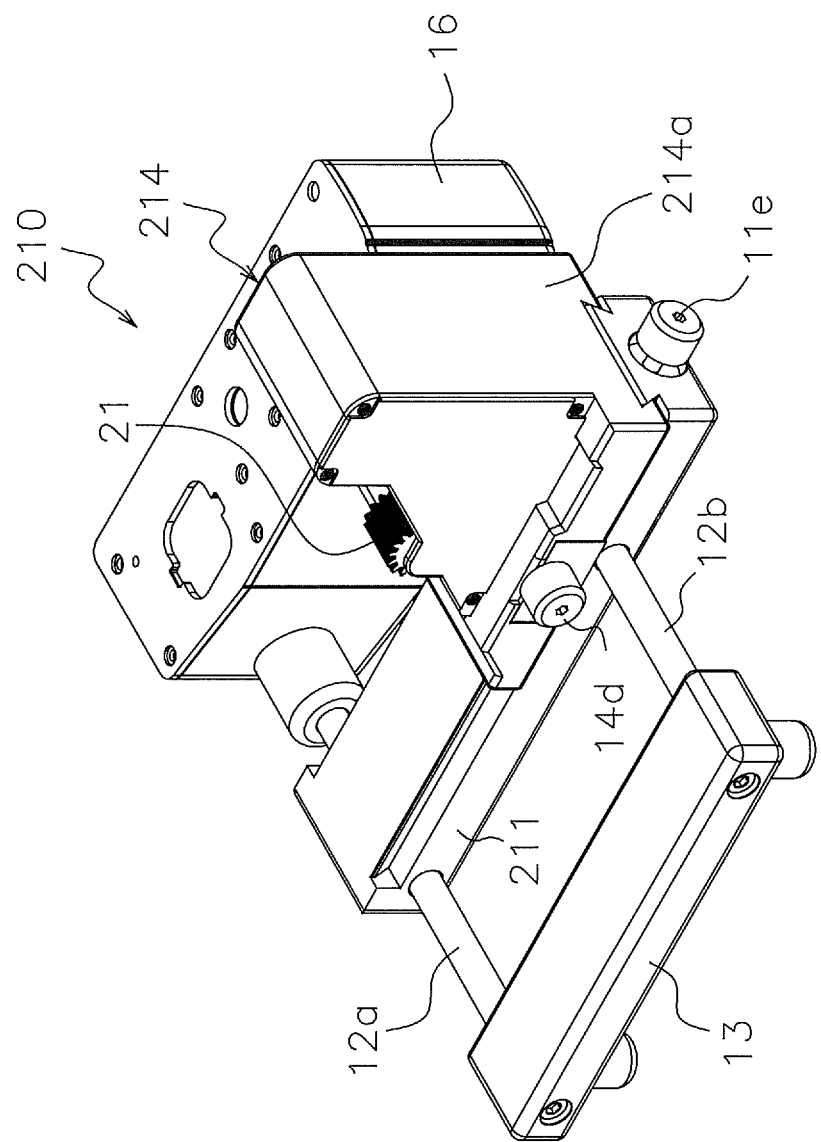
FIG. 21 is an oblique view showing the state before the movement of the zoom ring drive device in FIG. 19.

That is, as shown in FIG. 21, the zoom ring drive device 210 of this embodiment comprises a guide unit (first guide unit) 211, two guide shafts 12a and 12b, a front unit 13, a guide unit (second guide unit) 214, a base unit 16, and a drive gear 21.

Figure 22:
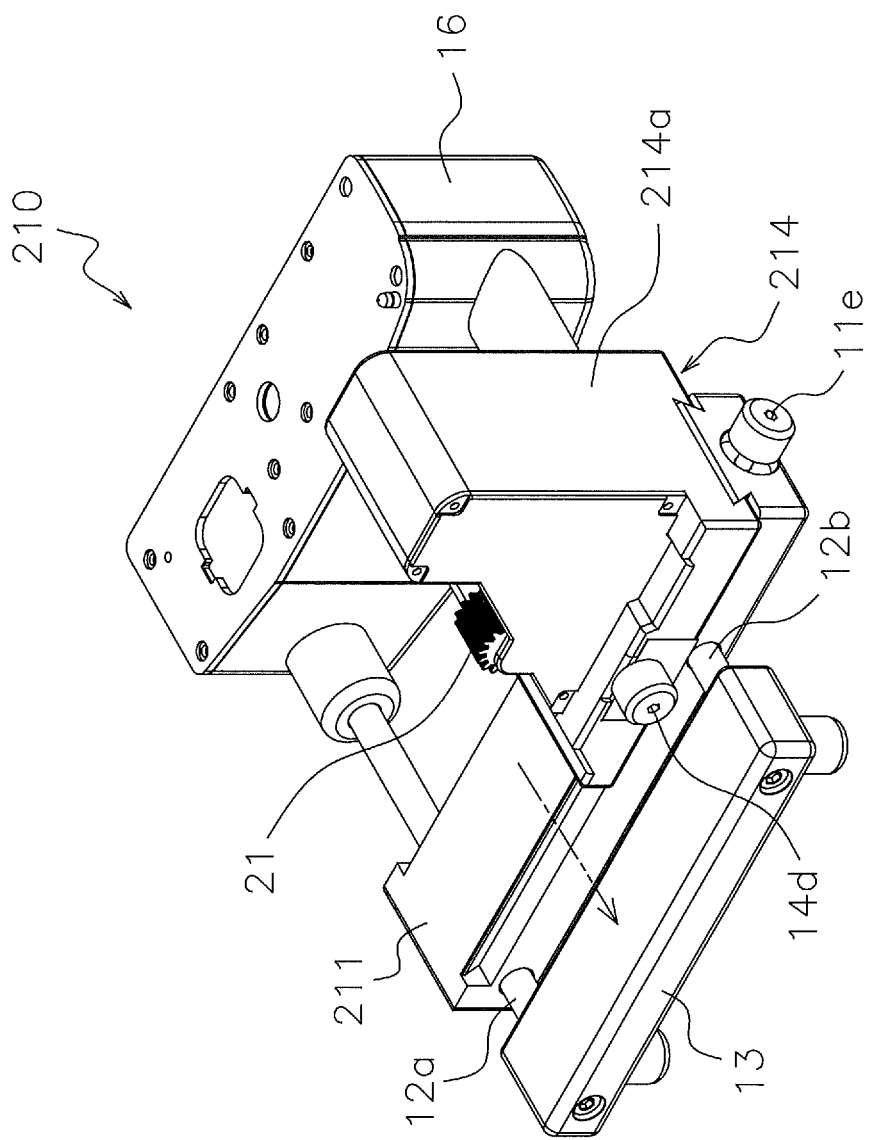
FIG. 22 is an oblique view showing the state when the guide unit of the zoom ring drive device in FIG. 19 has moved in the optical axis direction.

As shown in FIG. 22, just as in Embodiment 1, the guide unit 211 is provided in a state of being able to move back and forth in the optical axis direction along the two guide shafts 12a and 12b (see the two-dot chain arrow in the drawing).

Figure 23:
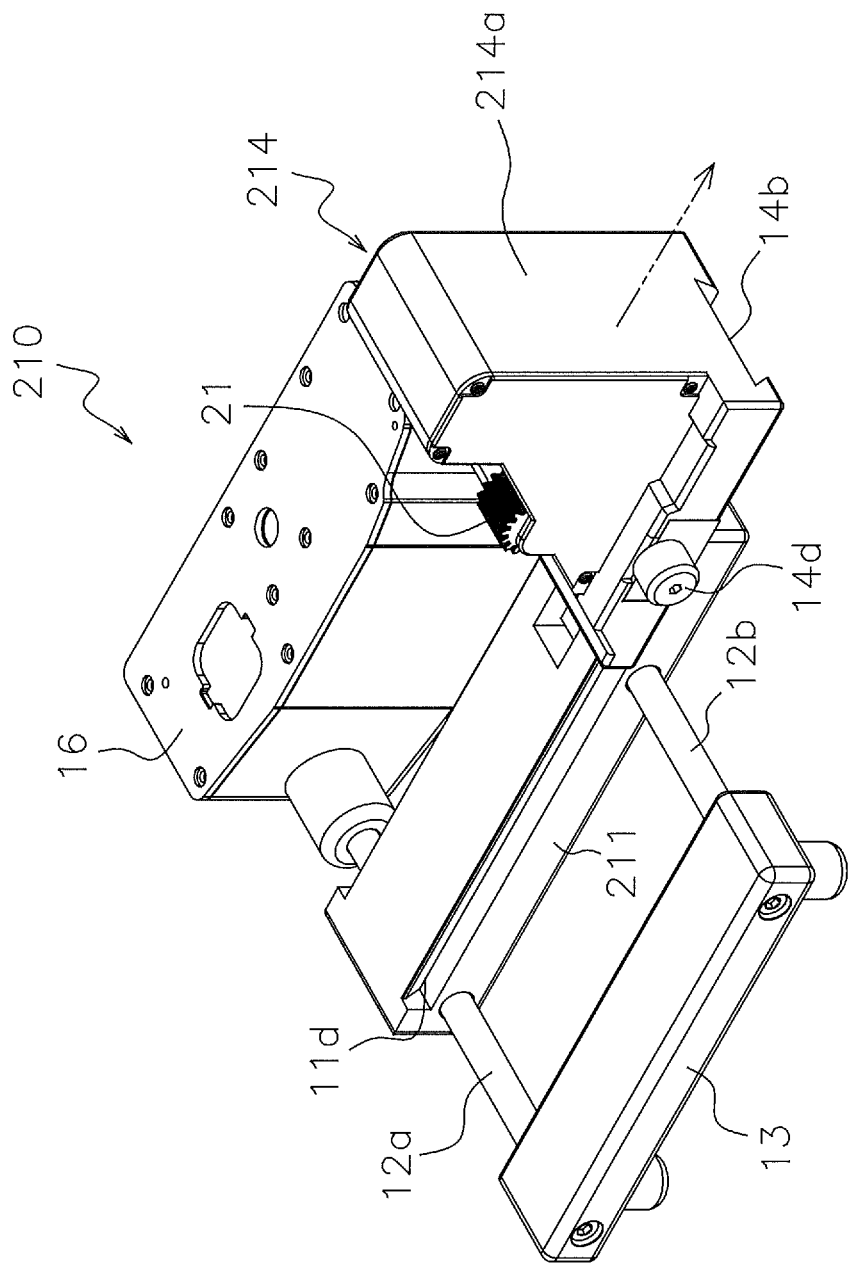
FIG. 23 is an oblique view showing the state when the guide unit of the zoom ring drive device in FIG. 19 has moved in a direction perpendicular to the optical axis direction.

As shown in FIG. 23, just as in Embodiment 1, the guide unit 214 is provided in a state of being able to move in a direction perpendicular to the optical axis direction along the lengthwise direction of the guide unit 211 (see the two-dot chain arrow in the drawing).

Consequently, as shown in FIG. 19, when the camera 30 is put in place on the zoom ring drive device 210, the lens barrel 32 is supported at one point by the drive gear 21 via the ring gear 25. The drive gear 21 is then controlled so as to be rotationally driven, which allows the zoom ring 33 to be rotationally driven in the desired direction and at the desired speed together with the ring gear 25, which has been set to mesh with the drive gear 21.

Other Embodiments

Embodiments of the present disclosure were described above, but the present disclosure is not limited to or by the above embodiments, and various modifications are possible without departing from the gist of the disclosure.

(A)

In the above embodiment, an example was given in which the zoom ring 33 was used as a manually operated ring driven by the zoom ring drive device (manually operated ring drive device) 10 of the present disclosure, but the present disclosure is not limited to this.

For instance, the part of the manually operated ring drive device that is driven in the present disclosure may some other ring member, such as a focus ring, instead of a zoom ring.

(B)

In the above embodiments, an example was given in which the zoom ring 33 was indirectly rotated via the ring gear 25 mounted in a state of being incapable of relative rotation on the outer peripheral surface of the zoom ring 33 of the lens barrel 32, but the present disclosure is not limited to this.

For instance, if the gear on the manually operated ring drive side and the gear on the manually operated ring side of the lens barrel have a shape and size that allow the two to mesh together, the configuration may be such that the zoom ring or the like is rotationally driven directly, with no ring gear interposed.

(C)

In the first embodiment, an example was given in which the outer peripheral surface of the lens barrel 32 was supported at three points, and in the third embodiment, the outer peripheral surface of the lens barrel 32 was supported at one point, but the present disclosure is not limited to this.

For instance, a lens barrel including a manually operated ring to be driven may be supported at two points, or may be supported at four or more points.

(D)

In the above embodiment, an example was given in which one or more of the rollers 20*a*, 20*b*, and 20*c* that indirectly supported the outer peripheral surface of the lens barrel 32 were attached in a state of being rotatable around a rotation shaft, but the present disclosure is not limited to this.

For instance, if the surface of each roller is made of a material with low frictional resistance, such as Teflon (registered trademark), and the frictional resistance can be reduced between the roller and the outer peripheral surface of the manually operated ring, then there is no need for all of the rollers to be rotatable, and at least some of the rollers may be non-rotatable.

(E)

In Embodiments 1 and 2, an example was given in which one spring 17 was provided on the side surface of the guide units 14 and 15 to apply a biasing force in the direction in which of moving the guide units 14 and 15, which are disposed so as to sandwich the lens barrel 32, closer together, but the present disclosure is not limited to this.

For instance, spring members that apply a biasing force to the two guide units may be provided on both side surfaces of the guide units. Alternatively, these may be provided at some other position, such as the bottom surface side of the two guide units.

(F)

In the above embodiment, an example in which the guide units 11 and 11 moved in the optical axis direction along the two guide shafts 12*a* and 12*b*, but the present disclosure is not limited to this.

For instance, just one guide shaft may be used as the guide shaft for guiding the first guide unit, or three or more guide shafts may be used.

(G)

In the above embodiment, an example was given in which the spring 17 was used as a biasing member for applying a tensile force for moving the guide unit 14 and the guide unit 15 in the direction of sandwiching the lens barrel 32, but the present disclosure is not limited to this.

For instance, instead of a spring, a member that applies a biasing force by magnetic force, pneumatic pressure, mechanical compressive force (pushing pressure produced by the rotation of a lead screw), or the like may be used as the biasing member.

(H)

In the above embodiment, an example was given in which the guide unit 11 pivoted up and down within the range of the slot 11*b* on the side of the guide shaft 12*a*, with the guide shaft 12*b* side at the center, but the present disclosure is not limited to this.

For instance, the guide unit (first guide unit) 11 may be configured to pivot up and down within the range of the slot 11*b* on the side of the guide shaft 12*b*, with the guide shaft 12*a* side at the center.

(I)

In the above embodiment, an example was given in which the zoom ring drive device 10 was used when capturing a moving picture, but the present disclosure is not limited to this.

For instance, this manually operated ring drive device may be used not only during the capture of a moving picture, but also during the capture of a still picture, a camera performance test, or the like.

(J)

In the above embodiment, an example was given in which what was driven was the camera 30, to which the lens barrel 32 can be attached to and detached from the camera body 31, but the present disclosure is not limited to this.

For instance, a camera that includes a lens barrel attached to the camera body in a non-detachable state may be what is driven.

INDUSTRIAL APPLICABILITY

The manually operated ring drive device disclosed herein has the effect of allowing mounting to a lens barrel regardless of the outside diameter of the lens barrel or the length in the optical axis direction, and therefore can be broadly applied to drive devices for driving a variety of manually operated rings, such as a zoom ring and a focus ring.

REFERENCE SIGNS LIST 10 zoom ring drive device (manually operated ring drive device)
11 guide unit (first guide unit)
11*a* main body portion
11*b* slot
11*c* through-hole
11*d* rail portion
11*e* fixing screw (first fixing portion)
11*f* fixing member (first fixing portion)
12*a*, 12*b* guide shaft
13 front unit
14 guide unit (second guide unit)
14*a* main body portion
14*b* rail portion
14*c* latched portion
14*d* fixing screw (second fixing portion)
15 guide unit (third guide unit)
15*a* main body portion
15*b* rail portion
15*c* latched portion
15*d* fixing screw
16 base unit
16*a* main body portion
16*b* insertion hole
17 spring (biasing member)
17*a* latching portion
18 fixing screw
18*a* threaded portion
20*a* roller (first roller)
20*b* roller (second roller)
20*c* roller (third roller)
21 drive gear
22 speed reducer
23 DC motor (drive unit)

24 control unit
25 ring gear
25a main body portion
25b gear portion
25c fastening portion
25d bolt
25e nut
26 power supply
27 external operation unit
30 camera
31 camera body
32 lens barrel
33 zoom ring (manually operated ring)
110 zoom ring drive device (manually operated ring drive device)
114 guide unit (second guide unit)
114a main body portion
115 guide unit (third guide unit)
115a main body portion
130 camera
132 lens barrel
140 centering mechanism
141 pinion
142 rack
142a gear
143 rack
143a gear
210 zoom ring drive device (manually operated ring drive device)
211 guide unit (first guide unit)
214 guide unit (second guide unit)
L1 lens

The invention claimed is:

1. A manually operated ring drive device configured to rotationally drive a manually operated ring included in a lens barrel mounted on a camera body, the manually operated ring drive device comprising:
   a first guide unit configured to slide in an optical axis direction of the lens included in the lens barrel;
   a second guide unit that is provided to the first guide unit and is configured to slide in a direction perpendicular to the optical axis direction;
   a drive gear that is provided at a position in the second guide unit that is in direct or indirect contact with the manually operated ring, and configured to rotate in a state of contact with the manually operated ring to rotate the manually operated ring; and
   a drive unit that is provided to the second guide unit and configured to rotationally drive the drive gear.

2. The manually operated ring drive device according to claim 1,
   further comprises a base unit to which the first guide unit is connected in a state of movably in the optical axis direction, and on which the camera body is mounted.

3. The manually operated ring drive device according to claim 1,
   wherein the second guide unit slides on an upper surface side of the first guide unit.

4. The manually operated ring drive device according to claim 1,
   further comprising a ring gear that has a gear portion that is detachably mounted around an outer periphery of the manually operated ring of the lens barrel so as to be unable to rotate relative to the manually operated ring, and configured to mesh with the drive gear,
   wherein the drive gear rotates by meshing with the gear portion to rotate the manually operated ring via the ring gear.

5. The manually operated ring drive device according to claim 1,
   further comprising a first roller that is disposed in the second guide unit in a state of being rotatable coaxially with the drive gear, and configured to support an outer peripheral surface of the lens barrel.

6. The manually operated ring drive device according to claim 5,
   further comprising a second roller that is disposed in a rotatable state at a position on an opposite side from the first roller with a horizontal plane including an optical axis of the lens included in the lens barrel in between, and configured to support the outer peripheral surface of the lens barrel.

7. The manually operated ring drive device according to claim 6,
   further comprising a third roller that is disposed in a rotatable state at a position on the opposite side from the first roller with the lens barrel in between, and configured to support the outer peripheral surface of the lens barrel.

8. The manually operated ring drive device according to claim 7,
   further comprising a third guide unit to which the third roller is provided, and that is provided to the first guide unit so as to sandwich the lens barrel with the second guide unit in a state of being able to slide in a direction perpendicular to the optical axis direction.

9. The manually operated ring drive device according to claim 8,
   further comprising a biasing member that has a first end connected to the second guide unit and a second end connected to the third guide unit, and configured to apply a pulling force which moves the second guide unit and the third guide unit in a direction of sandwiching the lens barrel.

10. The manually operated ring drive device according to claim 8,
    further comprising a first shaft and a second shaft configured to guide the first guide unit so as to move in the optical axis direction,
    wherein the first shaft is provided on a second guide unit side, and the second shaft is provided on a third guide unit side.

11. The manually operated ring drive device according to claim 10,
    wherein the first guide unit has a slot configured to support the first shaft or the second shaft movably within a specific range in a substantially vertical direction.

12. The manually operated ring drive device according to claim 10,
    further comprising a first fixing portion configured to fix the first guide unit with respect to the first shaft and/or the second shaft, and position the first guide unit in the optical axis direction.

13. The manually operated ring drive device according to claim 8,
    further comprising a centering mechanism having a rack portion that is provided to each of the second guide unit and the third guide unit and is disposed in a direction perpendicular to the optical axis direction, and a pinion configured to rotate in a state of being engaged with the rack portion and move the second guide unit and the third guide unit in left and right symmetry via the rack portion.

14. The manually operated ring drive device according to claim 7,
further comprising a ring gear that is detachably attached around an outer periphery of the manually operated ring of the lens barrel so as to be unable to rotate relative to the manually operated ring,
wherein the ring gear has a contact surface with which the first roller, the second roller, and the third roller are each in contact, and a gear portion that meshes with the drive gear.

15. The manually operated ring drive device according to claim 1,
further comprising a second fixing portion configured to fix the second guide unit to the first guide unit, and position the second guide unit in a direction perpendicular to the optical axis direction.

* * * * *